United States Patent [19]
Ikenoue et al.

[11] Patent Number: 5,268,993
[45] Date of Patent: Dec. 7, 1993

[54] PRINTER

[75] Inventors: Yoshikazu Ikenoue, Toyohashi; Nobuo Kamei, Toyokawa; Motomi Kawamura, Aichi; Eiichi Yoshida, Toyokawa; Katsunori Suzuki, Machida, all of Japan

[73] Assignee: Minolta Camera Kabushiki Kaisha, Osaka, Japan

[21] Appl. No.: 709,980

[22] Filed: Jun. 4, 1991

[30] Foreign Application Priority Data

| Jun. 4, 1990 | [JP] | Japan | 2-145582 |
| Jun. 4, 1990 | [JP] | Japan | 2-145583 |
| Jun. 4, 1990 | [JP] | Japan | 2-145584 |
| Jun. 4, 1990 | [JP] | Japan | 2-145585 |

[51] Int. Cl.⁵ ............................................. G06K 15/00
[52] U.S. Cl. ..................................... 395/114; 395/112
[58] Field of Search ............... 395/112, 114, 115, 116, 395/164–166, 500; 400/70–73, 76; 346/154; 358/467, 445

[56] References Cited

U.S. PATENT DOCUMENTS

| 4,450,453 | 5/1984 | Kitamura et al. | 395/114 |
| 4,523,299 | 6/1985 | Donohue et al. | 395/114 |
| 4,720,813 | 1/1988 | Kaneko | 395/114 |
| 4,754,428 | 6/1988 | Schultz et al. | 395/114 |
| 4,837,737 | 6/1989 | Watanabe | 395/114 |
| 4,866,671 | 9/1989 | Yokoyama | 395/114 |
| 5,047,957 | 9/1991 | Ikenoue | 395/114 |
| 5,068,807 | 11/1991 | Ikenoue | 395/115 |

FOREIGN PATENT DOCUMENTS

| 62-179241 | 8/1987 | Japan | 395/114 |
| 2-113323 | 4/1990 | Japan | 395/114 |
| 2-132517 | 5/1990 | Japan | 395/114 |

Primary Examiner—Arthur G. Evans
Attorney, Agent, or Firm—Burns, Doane, Swecker & Mathis

[57] ABSTRACT

A printer comprising: printing means for forming an image on a paper; setting means for setting independently a plural kind of analytical conditions for printing information; a plurality of store means each for storing a set of setting values which correspond to the analytical conditions of said plural kind of printing information set by said setting means; first selective means for selecting one among said plurality of said store means; a plurality of analytical means each for analyzing inputted printing information in accordance with analytical conditions for printing information stored in the store means selected by said first selective means based on respective inherent protocol; second selective means for selecting analytical means to be used among a plurality of analytical means; and control means for controlling said printing means in accordance with the printing information analyzed by the selected analytical means; wherein said first selective means selects a predetermined store means among said plurality of store means in response to the selection of analytical means by said second selective means. A user can set analytical conditions for printing information for each application conveniently without errors.

21 Claims, 26 Drawing Sheets

Fig. 5

EMT (Editing mode table)

STYLE code

| | | | MENU code |
|---|---|---|---|
| 0 (STD) | EMTC common information | default emulation (DEFEMU) | |
| | | size of upper cassette | |
| | | size of middle cassette | |
| | | size of lower cassette | |
| | EMT0 setting values of standing style | number of copies (COPY) | |
| | | current font (FONT) | |
| | | current cassette (CASS) | |
| 1 | EMT1 setting values of style A | current style (STYLE) | |
| | | editing size information etc. | |
| 2 | EMNT2 setting values of style B | style name (SNAME) | 0 |
| | | emulation code | 1 |
| | | font selection information — font pitch | 2 |
| | | font selection information — font pitch | 3 |
| | | font selection information — character set | 4 |
| 3 | EMT3 setting values of style C | margin | 5 |
| | | printing character offset | 6 |
| | | line width | 7 |
| | | | 8 |

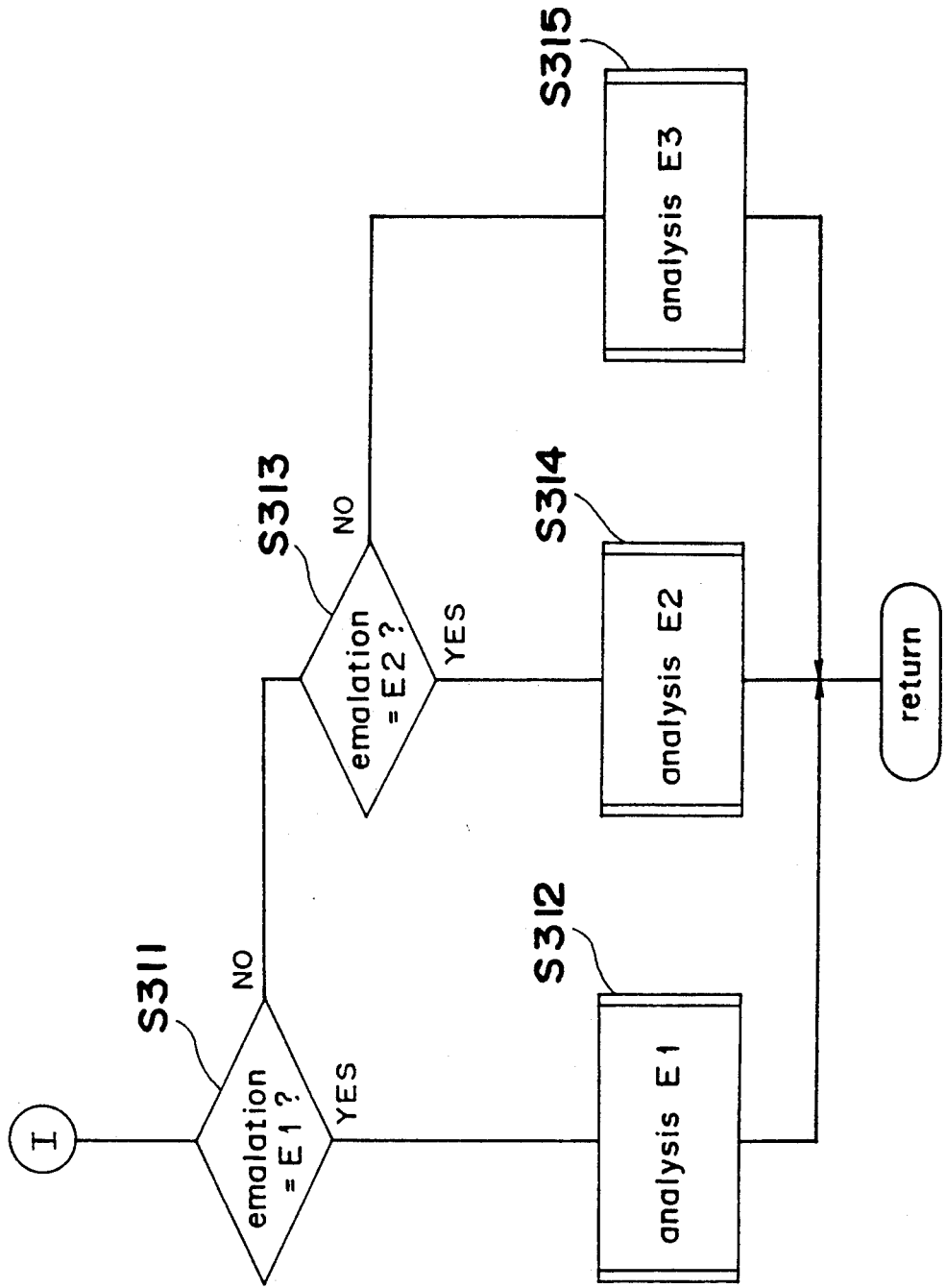

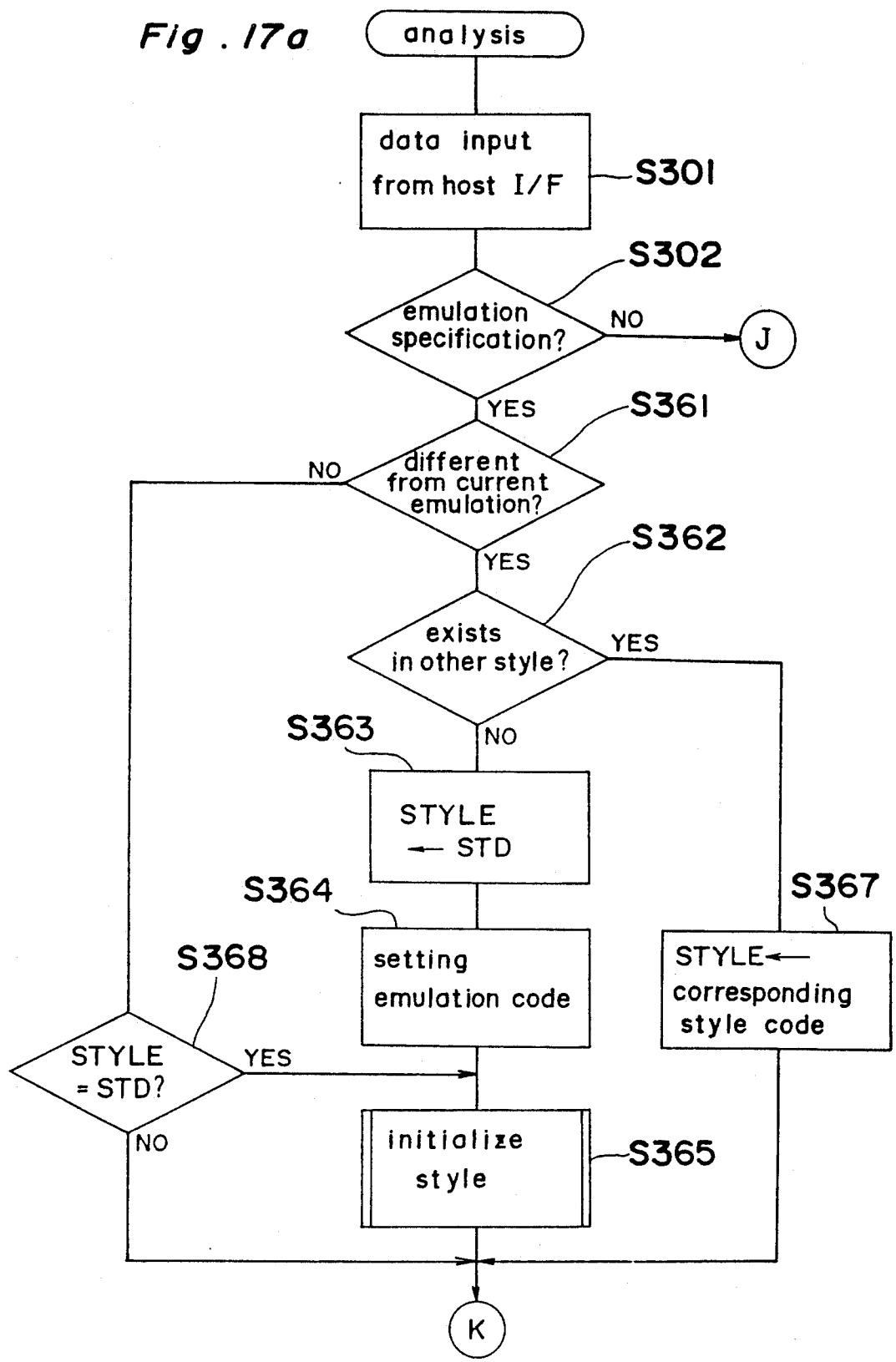

PRINTER

DETAILED DESCRIPTION OF THE INVENTION

2. Field of the Invention

The present invention relates to a printer and a control apparatus of a printer in which an emulation function is supported.

2. Prior Art

Conventional printers receive input data only of a specific code system and print them. That is, the printers were made compatible one by one with specific host devices (such as host computers, computer-aided design (CAD) devices, and the like). Therefore, a specific type of printers were able to print input data received only from specific host devices, but were unable to print data from the other host devices.

However, nowadays there are printers available for connecting with a plurality of host devices. In this case, the meaning of code to be inputted varies according to every host machine to be connected with. That is, they differ in printing data, command format, and meaning. Therefore, in these printers, emulation function for corresponding with the protocol difference of each host is supported,-so that data inputted to the printer is first analyzed by emulation and then converted into protocol of the corresponding printer. Even when the printer is connected with the same host, and when the host works for a different application, for instance, works as a word processor or CAD device, there are ones which permit printing in correspondence with such a selected situation. In this case, an emulation function is supported similarly in order to make it possible to correspond with the protocol which varies with application.

In the meanwhile, today's printer has more highly-sophisticated functions which, accordingly, permit larger number of items to be set on the operating panel, for instance, kind of fonts, margins, number of printing sheets, paper sizes, and the like.

Since it is troublesome for users to set number of items as indicated above, there are printers which allows to set a predetermined default conditions, and to register a combination of some kinds of setting items in advance.

There is a computer supported with conventional emulation function, in which an emulator is changed by changing a cartridge (or by changing an emulation software) in the power-off condition. Upon turning on the power again, the printer starts operating with the preset emulation.

Besides, there is a printer provided with a plurality of emulations wherein emulation can be switched during the input of data from the host. In this case, on switching the emulation, its own single initialization is carried out in the emulation for each item on the operational panel. In these printers, on switching emulation, all the setting items on the operational panel are initialized to predetermined setting values. Therefore, users are requested to set every setting value thereafter. On the other hand, there has been a printer having a kind of emulation and being able to initialize the setting menu.

If we take into account user's convenience, it is better if a plurality of emulation is provided and the emulation can be set as one of the setting items on the operational panel.

However, the number of setting items on the panel is increasing in accordance with the higher performance of the latest printers. As setting items vary with the emulation, if values impossible to be set with the emulation are set, for example on a print pitch of fonts, a print offset, and the like, errors may be generated or the printing position may overrun the limited range of paper size.

When it is possible to set two emulations for printing characters, and when the fonts which the original printer supports are different from each other, the interchangeability may be lost because the font which should originally be used is selected unless font to be used according to the emulation is selected.

SUMMARY OF THE INVENTION

An object of the present invention is, in a plurality of printer provided with emulation, to provide a printer control apparatus capable of designating emulation and setting analytical conditions associated therewith.

A printer, according to the present invention comprises: printing means for forming an image on a paper; setting means for setting independently a plural kind of analytical conditions for printing information; a plurality of store means each for storing a set of setting values which correspond to the analytical conditions of said plural kind of printing information set by said setting means; first selective means for selecting one among said plurality of said store means; a plurality of analytical means each for analyzing inputted printing information in accordance with analytical conditions for printing information stored in the store means selected by said first selective means based on respective inherent protocol; second selective means for selecting analytical means to be used among a plurality of analytical means, and control means for controlling said printing means in accordance with the printing information analyzed by the selected analytical means; wherein said first selective means selects a predetermined store means among said plurality of store means in response to the selection of analytical means by said second selective means.

It is an advantage of the present invention that in a printer which supports two or more analytical means (emulations), a plurality of printing processing conditions of analytical conditions can be set in the printing controller It is another advantage of the present invention that the set value of this printing information processing can be set by a user with the setting means in accordance with each application. It is a further advantage of the present invention that the processing state for printing conditions can be changed with the conditions changing means, to a predetermined value that enables setting by the condition change means.

BRIEF EXPLANATION OF THE DRAWINGS

Further objects and advantages of the invention will become apparent from the description in the specification with reference to the drawings, in which:

FIG. 5 is a diagram of an editing mode table.

EMBODIMENT

Embodiments of the present invention will be described below with reference to the accompanying drawings.

(a) Structures of printer and control

Schematic structures of printer and control apparatus will be explained below.

Figure 1:
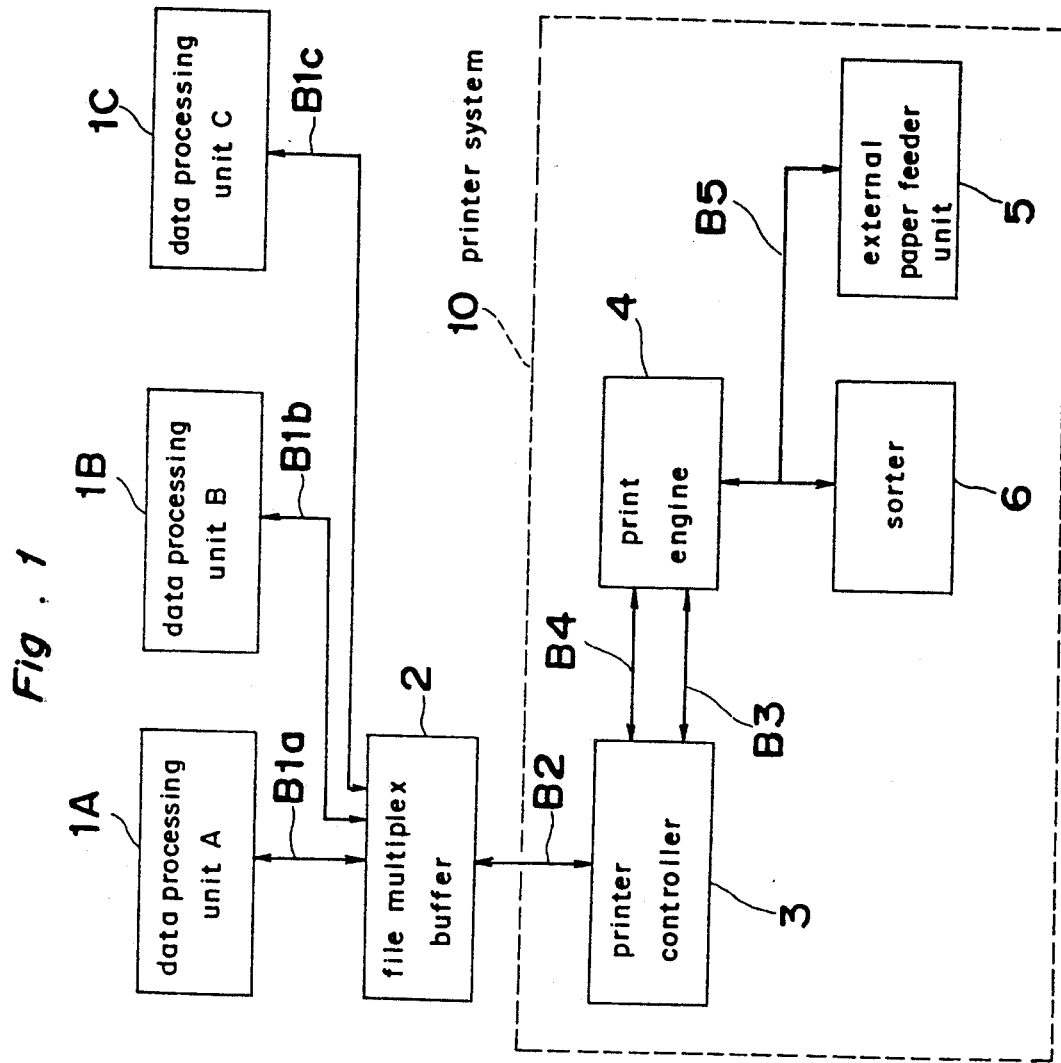
FIG. 1 is a block diagram showing a structure of a printer system.

FIG. 1 shows a structure of processing system in a printer system 10 of an embodiment of the present invention.

Data received from a plurality of data processing devices (host devices such as host computer, a CAD device and the like) 1A, 1B and 1C are once stored in an external file multiplex buffer 2, and then outputted to the printer system 10. The file multiplex buffer 2 also has a function as a multiplexer to connect a plurality of data processing devices 1A, 1B and 1C to a printer.

The printer system 10 consists of a printer controller 3, a print engine 4 provided with an electrophotographic process and a laser, and such auxiliary devices as an external paper feeder unit 5, a sorter 6, and the like.

Figure 2:
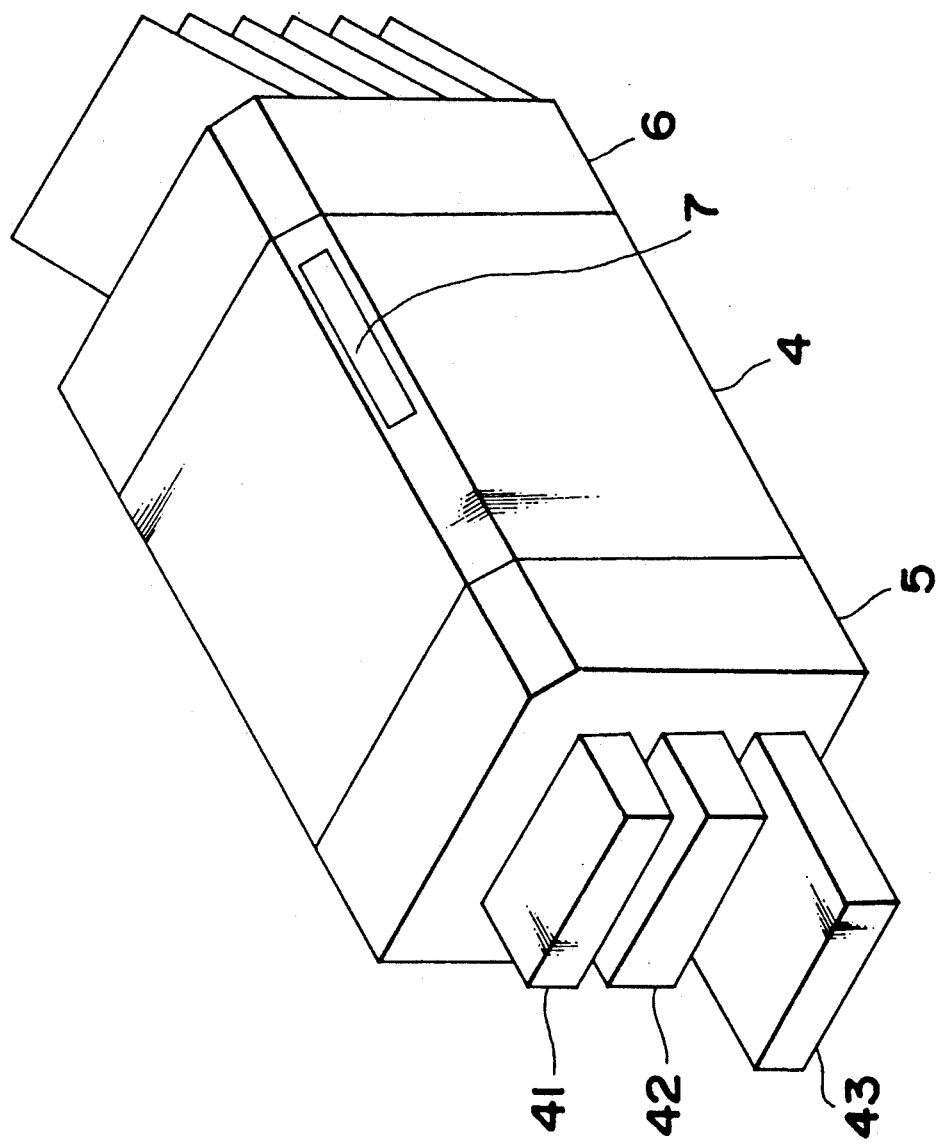
FIG. 2 is a perspective illustration of showing a printer.

FIG. 2 shows an appearance of the printer system 10. The print engine 4 includes the aforementioned printer controller 3, being able to be connected with the external paper feeder unit 5 having three paper feed cassettes 41, 42 and 43 and a sorter 6. On the upper front of the print engine 4, an operational panel 7 on which displays showing states of the system and keys for performing simple operations are arranged.

Figure 3:
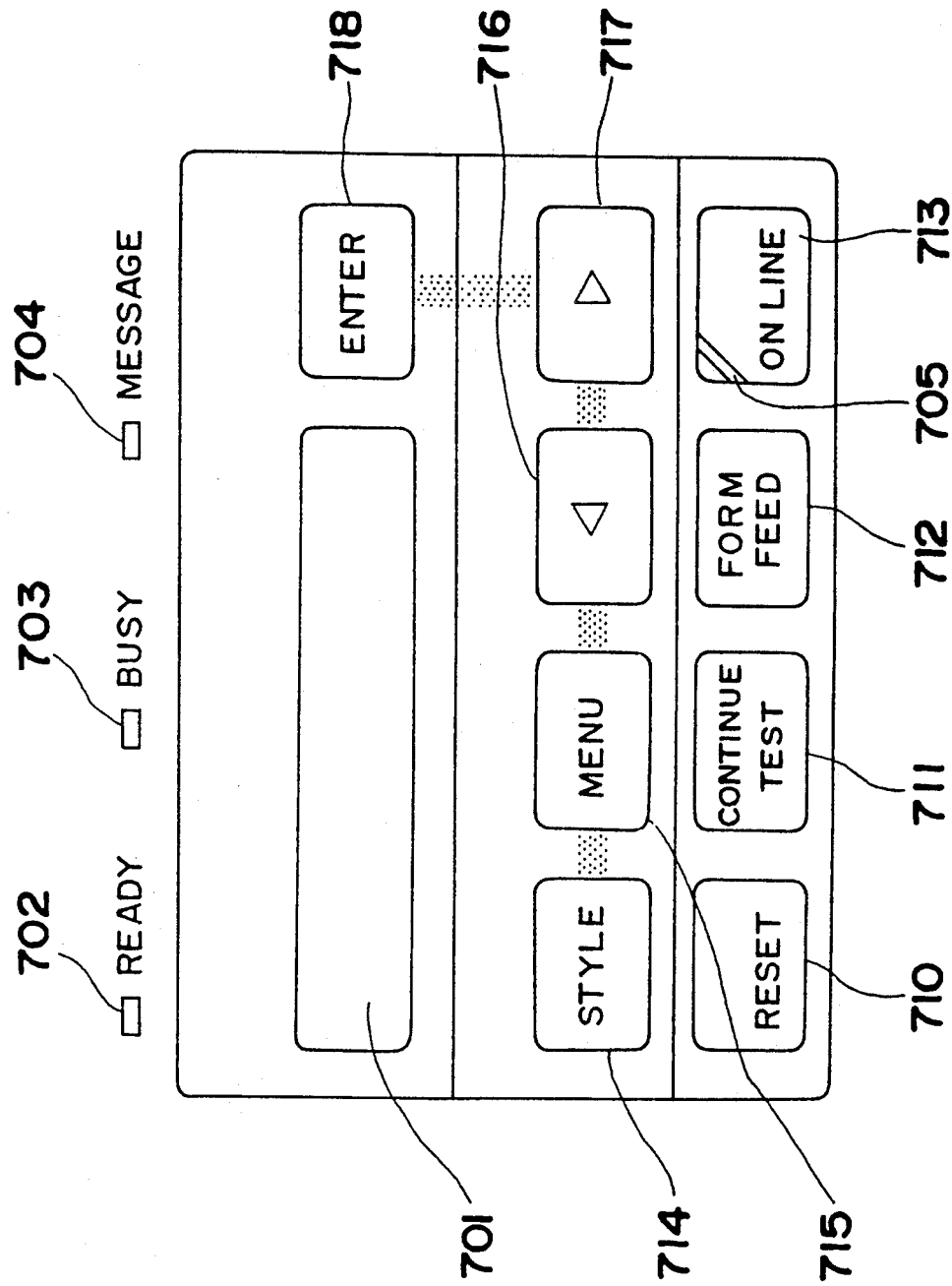
FIG. 3 is a layout drawing showing a control panel.

FIG. 3 shows a layout of the operational panel 7. The operational panel 7 consists of a message display 701 being able to display characters, LEDs 702 to 705, and input keys 710 to 718. The reset key 710 relinquishes data under processing and returns the printer to the initial state, the text key 711 performs a test-print during the standby and then allows for printing by deleting an error when the error has resulted from overflow of down-loaded font, the discharge key 712 forcefully prints the data contained in the printer, and the online key 713 switches inhibition and authorization of data received from a data processing device.

In this printer, setting a plurality of print mode (style) is possible, and the printing mode is switched with the STYLE key 714. For each print mode, there are a plurality of setting items (menu), and the MENU key 715 is used to switch the menu in the order of the MENU codes shown in FIG. 5. Setting of emulation is included in the setting items. For each item, a selectable range of each item is displayed, and a specific value can be selected in the predetermined range sequentially with changing keys 716 and 717. The value selected is registered by pushing down the ENTER key 718 in a corresponding style of an editing mode table (refer FIG. 5) which will be mentioned later.

Figure 4:
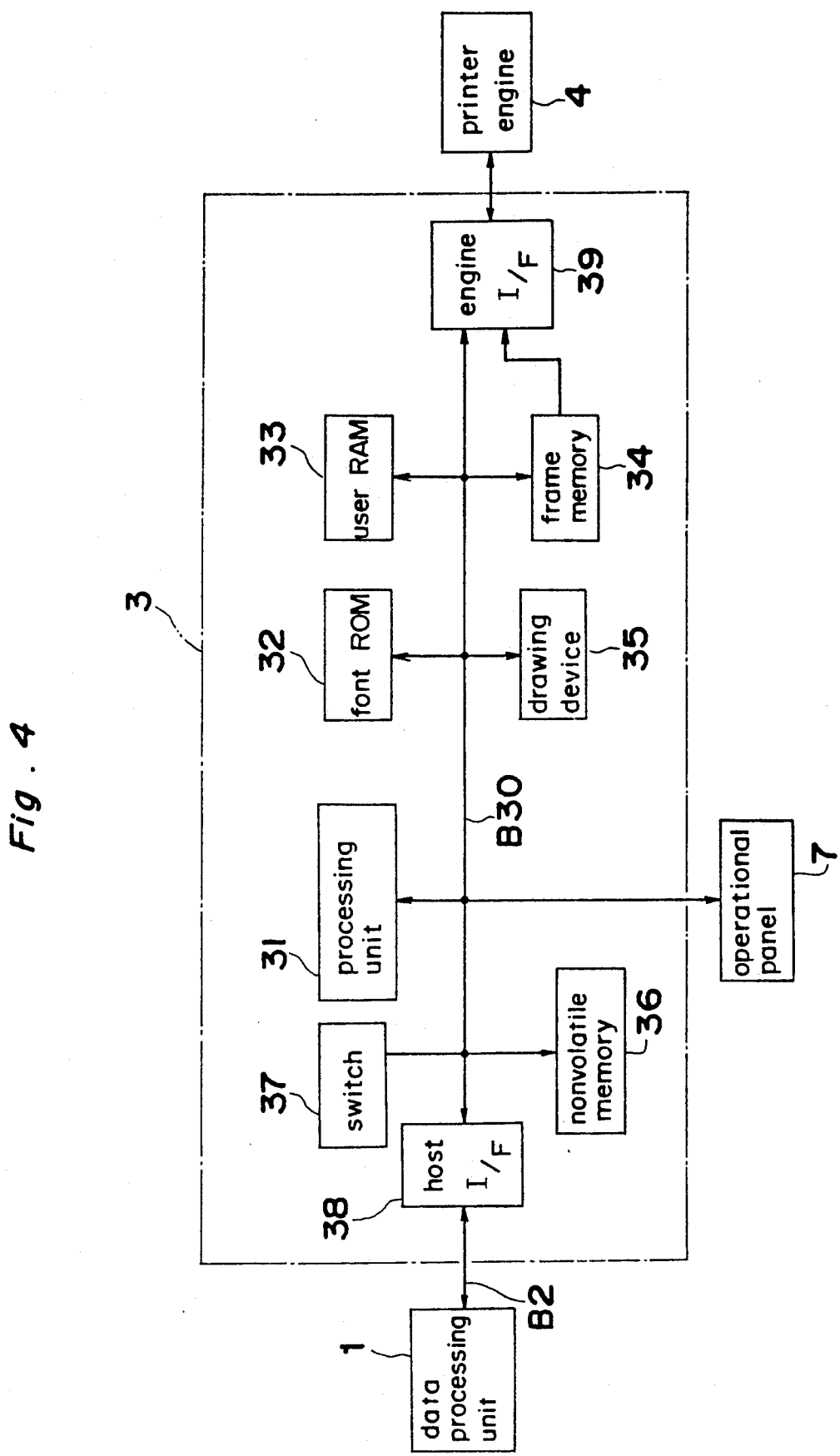
FIG. 4 is a block diagram of a printing controller.

FIG. 4 shows a structure of the printer controller 3. The printer controller 3 is controlled by a processing device 31. The printer controller 3 is connected with the an external via an internal bus B30 through two interfaces 38 and 39. What are connected with the internal bus B30 include a font ROM 32 for storing information for printing font patterns and their sizes and attributes, a user RAM 33 having an area in which user's own font is registered, a frame memory 34 having an area for editing printing images (to be outputted to the print engine 4 after the editing is finished), and a drawing device 35 for drawing printing images in the frame memory 34, a nonvolatile memory 36 for storing a printing mode set by the user for preparing the next use even after the power supply is turned off, a switch 37 for setting the initializing conditions after the power supply is turned on conditions for every destination and the initialization conditions of the nonvolatile memory 38, and the operational panel 7.

(b) Setting the emulation

In this printer, three emulations E1, E2 and E3 are supported. Here, the emulations E1 and E2 are emulations for character printing, but because there are differences in function in the printer, they are treated as different emulations to each other. Concretely, they differ in the kind of fonts to be used, and the existence or non-existence of printing offset. The emulation E3 is an emulation of plotter used for CAD.

TABLE 1

| | Table of functions in each emulation | | | | | |
|---|---|---|---|---|---|---|
| Emulation | Font | Font | Character set | Margin | Printing offset | Line thickness |
| E1 | o | o | o | ±30 | x | x |
| E2 | o | o | S1-S3 | x | x | x |
| E3 | x | x | x | x | x: ±30<br>y: ±30 | 1-9 | o: able to be set
x: unable to be set

As shown in Table 1, the functions of respective emulation E1, E2, and E3 are different from each other, and items and their ranges that can be set are varied depending upon the emulation. In the emulation E1 and E2 such functions as font pitch, font point, character set and the like are set, but printing offset and line thickness cannot be set. On the other hand, the emulation E3 is opposite to the former as to the setting.

This printer is able to expand the function which is set on the operational panel, and emulation can also be set with the operational panel 7. That is, after displaying an emulation menu (MENU code=1) and by switching the menu with the MENU key 715 on the operational panel 7, a specific emulation is selected with the setting value change keys 716 and 717 in the menu and then the ENTER key 718 is pressed down. Then, the emulation is registered in the editing mode table (refer FIG. 5) in the memory in the processing device 31. On the other hand, in the initial value table (Table 2) stored in the memory, general initial values in the emulation are stored. Then, the initial values in various setting items of the corresponding emulation are read from the initial value table, and they are written in the editing mode table (refer FIG. 14, steps S511-S536).

TABLE 2

| Table of initial values in each emulation | | | | | | |
|---|---|---|---|---|---|---|
| Emulation | Font pitch | Font point | Character set | Margin | Printing offset | Line thickness |
| E1 | 10 | 12 | S0 | +5 | x | x |
| E2 | 12 | 10 | S1 | x | x | x |
| E3 | x | x | x | x | x:0 y:0 | 1 |

Since the setting values in the initial value table (Table 2) are so fixed in advance that they will not cause troubles, a user need not confirm all of the setting items when changing the emulation.

Figure 9:
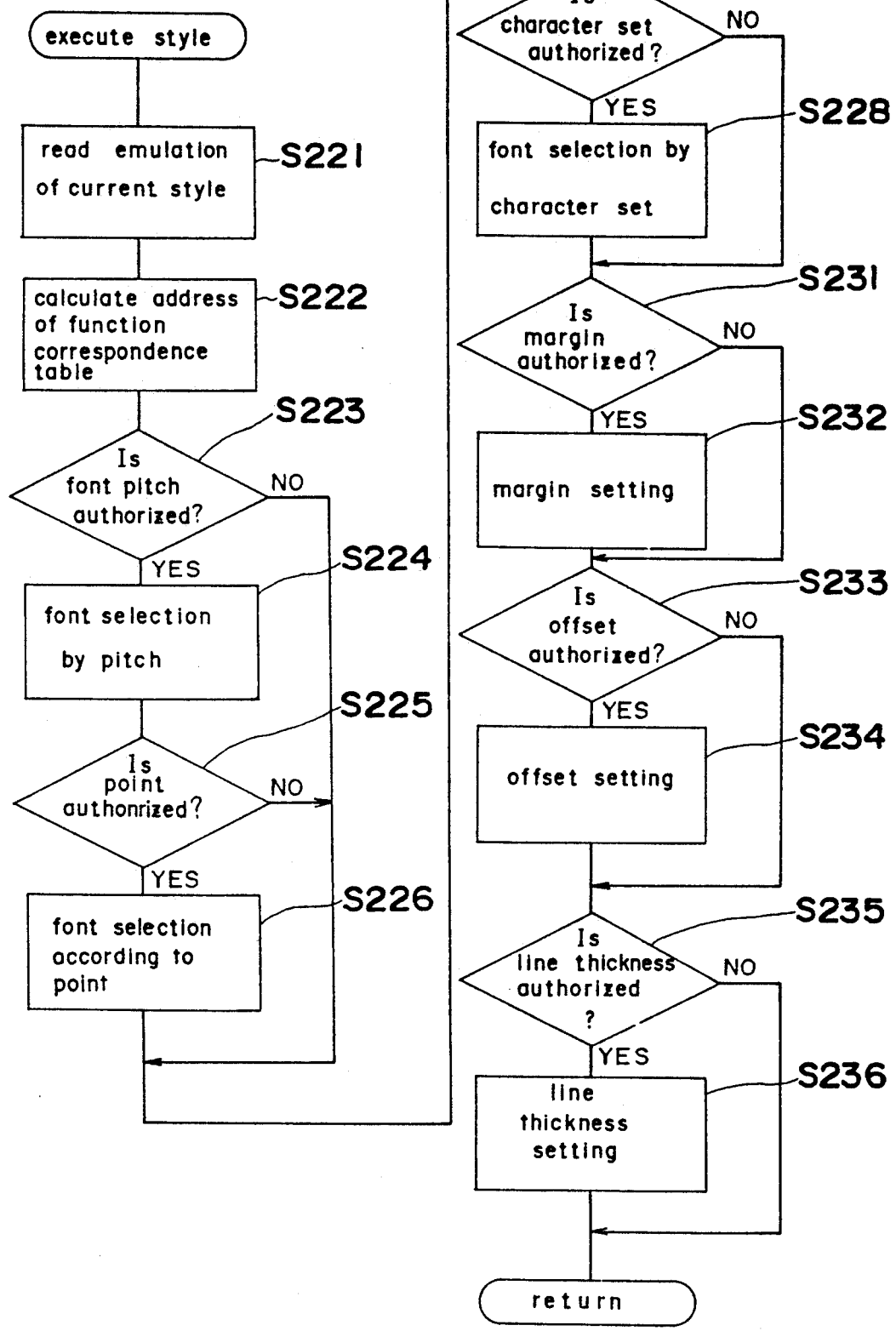
FIG. 9 is a flow chart of the execution of style.

Besides, in this initialization the initial values may be in the emulation itself (steps S312, S314 and S315 in FIG. 9). A user can change the values of the setting items in the set emulation with the operation panel 7 after setting the initial values. The change in setting values are made with reference to the Table 1 of functions in each emulation. First, an items menu including items desired to be set is displayed with the MENU key 715. In this case, when this item is decided to be unable to be set in the Table of functions, the menu is not displayed. Then, the value of the menu is changed with the setting value change keys 716 and 717. In this case, it is checked from the Table of functions whether or not the value for the setting items lies within a range in which the setting is possible, and then the next value is displayed if it is impossible. Therefore, only the value within the range in which the setting is possible with the emulation is always displayed. Then, upon pushing down the ENTER key 718, the values currently being displayed are written in the editing mode table (refer steps S511–S532 in FIG. 14). Therefore, only the value that will not cause troubles can be set when a user carries out the setting of each function corresponding to each application.

As explained above, when an emulation is assigned, the initial values which correspond to the emulation for each setting item is set or changed further. In the present embodiment, one set of setting values (it may differ from the initial values) which further includes an assignment of the emulation is stored in a memory. On the operational panel 7, by assigning a set of those setting values (called as "style"), an emulation is also assigned. That is, an emulation and various setting values in the emulation are registered as a printing mode called as "style" in the editing mode table, and once a printing mode is registered, the printing mode is set with the STYLE key 714 thereafter. Explanation for the details will follow in paragraph (c).

On the other hand, in the present embodiment, the emulation can be changed from data processing devices (host) 1A, 1B and 1C. As the hosts are not made to correspond to the specific printer, setting items specific to each printer can not be set from the host in general. Therefore, it should be considered that change in emulation from the hosts will not cause trouble. In this case, when input data from the hosts is analysed, processing for emulation setting is made if input data are decided as an emulation designation code, but explanation for the details thereof will be given in paragraph (d).

(c) Printing mode

In the present printer, a total of up to four printing modes (styles) ca be registered in the editing mode table (refer FIG. 5). Each printing mode is an integrated group which consists of setting values of the emulation and those of setting items suitable to every application under the emulation. Once the printing mode is registered, a user may change setting values automatically by selecting a printing mode, and thereby the setting which meets each application can be easily utilized.

FIG. 5 shows setting values in the editing mode table. A total of four printing modes (style) is separately set in respective region different from the common information, and identified by STYLE code (0 (STD), 1, 2, 3) which are registered in the common information. They are called as standard style, style A, style B, and style C.

The standard style is initialized in accordance with the assigned emulator with the switch 37 at initialization (FIG. 7, steps S105–S108) when the power supply is turned on. Other three styles (style A, style B and style C) can be selected by STYLE key 714 (FIG. 14, steps S504–S508). The style currently being selected is called current style. Each setting items for each style is automatically set according to the initial value table (Table 2) (refer FIG. 8). Besides, the three styles other than the standard style are also stored in the nonvolatile memory 36.

As shown in the right in FIG. 5 in detail, setting values for each style includes values for style name, emulation code, font pitch, font point, character set, margin, printing offset, and line width. Change in setting values of each item is carried out in such a manner that a menu is displayed in a message display 701 by pressing down MENU key 715 with MENU code (=NMENU) as shown right in FIG. 5, display values are changed with the display change keys 716 and 717, and setting values for style (current style) corresponding to STYLE code of the common information are changed by pressing down the ENTER key 718 (FIG. 14 steps S511–S532). Setting values under each emulation can be changed with the operational panel 7 in this manner. Since only the values that are possible to be set are displayed with reference to Table of functions corresponding to each emulation, any trouble will not be caused.

The common information for editing mode table (EMTC) (FIG. 5) stores such setting values on printing mode as default emulation, current font, current style (STYLE), and information on printing, which does not relate to emulation, such as paper size of each current cassette selected and the number of copy sheets.

In the editing mode table as shown in FIG. 5, a setting region was set at every style. However, a region for each setting function may be set to be read out, for instance, in a matrix form.

(d) Assigning the emulation from a host side

In this embodiment, an emulation possible to be assigned from data processing devices (host) 1A, 1B, and 1C in a printer having a plurality of emulation. As host devices are not made to correspond to a specific printer, a processing conditions of each printer can not be assigned. Therefore, if assignment only of emulation is allowed, it may cause troubles due to contradiction to a prior setting with the operational panel 7 because the host is positioned apart from the printer (operational panel 7). Then, troubles should be prevented beforehand In the example shown in FIG. 10, input data of emulation assignment received from the host device ar first decided if it differs from the current emulation. If it is a different emulation, troubles may be generated which breaks the setting (analytical conditions) with the operational panel before the assignment, because an emulation is switched from the emulation currently selected. Then, in case of assigning a different emulation, STYLE code which shows current style is taken as a standard style (STD). On the other hand, when it is decided to be the same emulation, STYLE code is treated as it is. And, troubles can be prevented by changing the setting values with reference to the initial value table (Table 2) according to the assigned emulation.

In the example as explained above, when the emulation is changed from the data processing devices (host) 1A, 1B, and 1C, initialization of all the setting item is carried out even if the same emulation as the one currently used is assigned. Therefore, the setting values as set on the operational panel by a user are neglected and thus all of them are initialized. However, in case the same user carries out the setting with the operational panel 7 and then sets the same emulation from a host, it is considered more convenient that the values set with the operational panel 7 can be used.

Figure 16A:
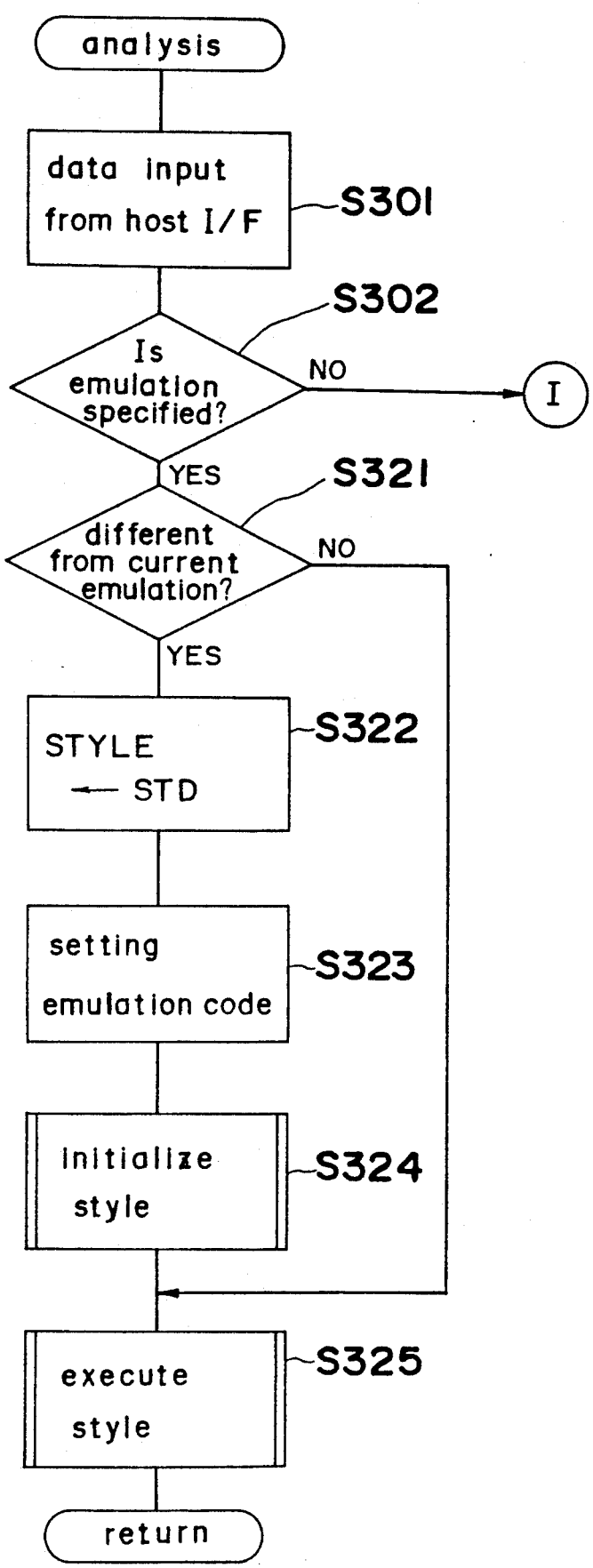
FIGS. 16 (a) and (b) are a flow chart of a modified example of input data analysis.

Then, in a modified embodiment as shown in FIG. 16, in case an emulation assignment inputted form a host is the same as the one currently used, setting value of the style are immediately assigned without carrying out initialization of each item of the style (steps S302, S321, and S325). In this manner, previous setting values adopted in the emulation can be utilized.

Figure 17B:
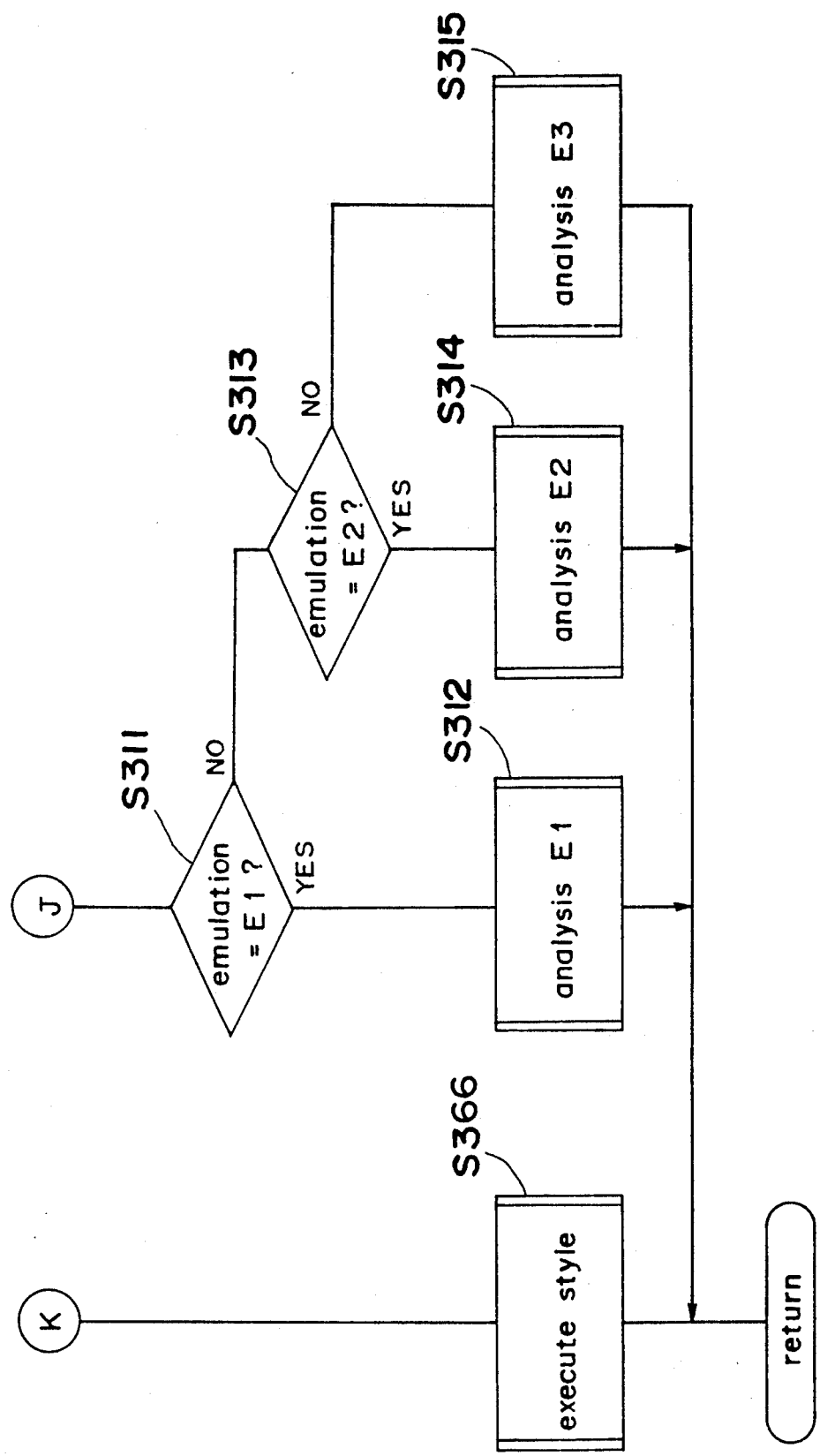
FIGS. 17 (a) and (b) are a flow chart of another modified example of input data analysis.

On the other hand, in another modified embodiment as shown in FIG. 17, even if the emulation assigned from the host are different from the emulation currently used (YES at step S341), when the same emulation is present in the printing mode which has previously been set with the operational panel (YES at S342), user's convenience can be increased by switching to the style of the same emulation initializing the analytical conditions set in the style. For instance, in case a style which is different from the standard style is used, a user may set the style beforehand with the operational panel so as for the user to print in the desired conditions.

In case a printing mode of the same emulation is not available (No at step S342), after the STYLE code is changed to the standard style (STD), the set values of the analytical conditions set in the standard style are initialized to standard values.

Furthermore, in case the emulation assigned from the host is the same as the style currently selected and it is not the a standard style (No at step S347), a value currently set is used as it is.

(e) Control flow of printing controller

Figure 6:
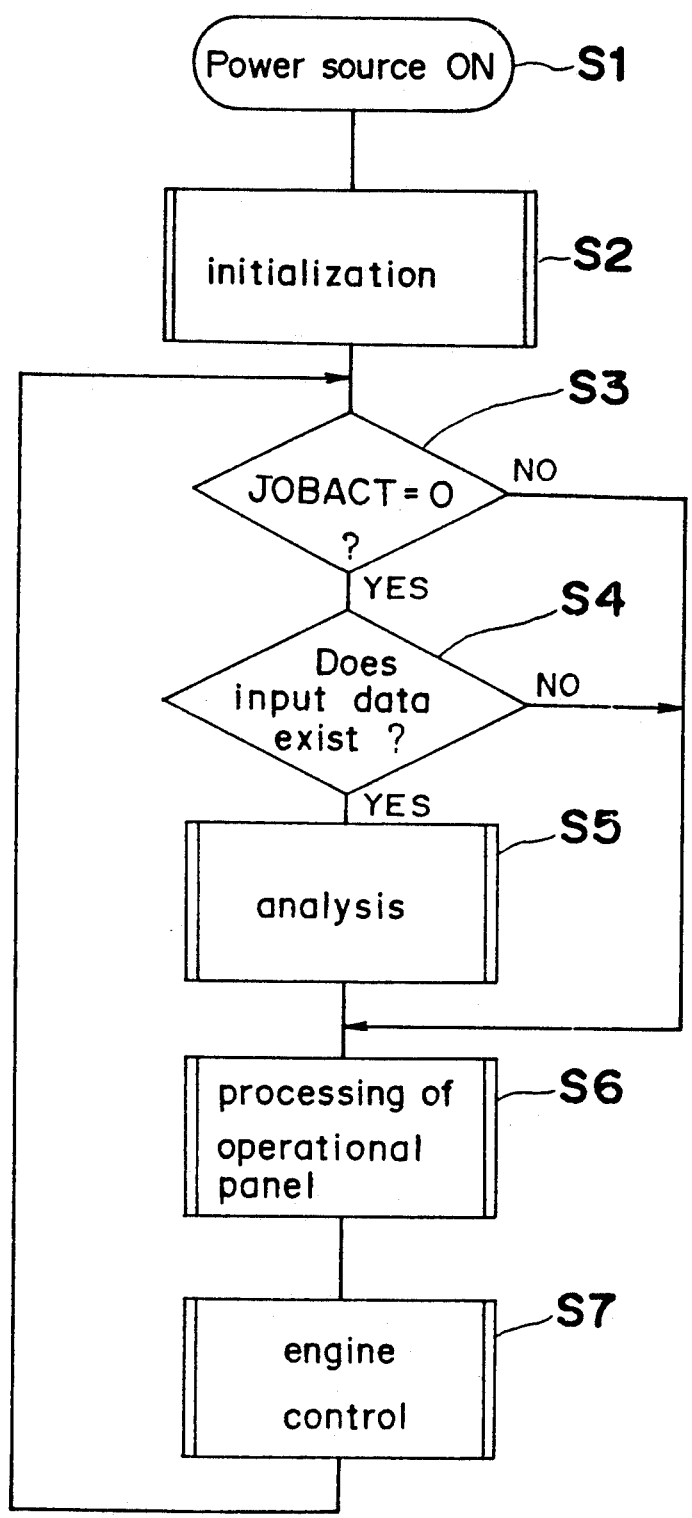
FIG. 6 is a flow chart of the control of processing device.

FIG. 6 shows a processing procedure of a processing device 31 which controls the printer controller 3. When the power supply of printer controller 3 is turned on (step S1), after initializing the internal area first (step S2), the flow goes to a main loop (steps S3-S7). The main loop consists of processing (steps S3-S5) of an input data inputted via a host interface 38 from a host (data processing devices 1A, 1B and 1C), control (step S6) of the operational panel 7, and a printing control (step S7) for the print engine 4. These processing are carried out in succession without stop.

Figure 7:
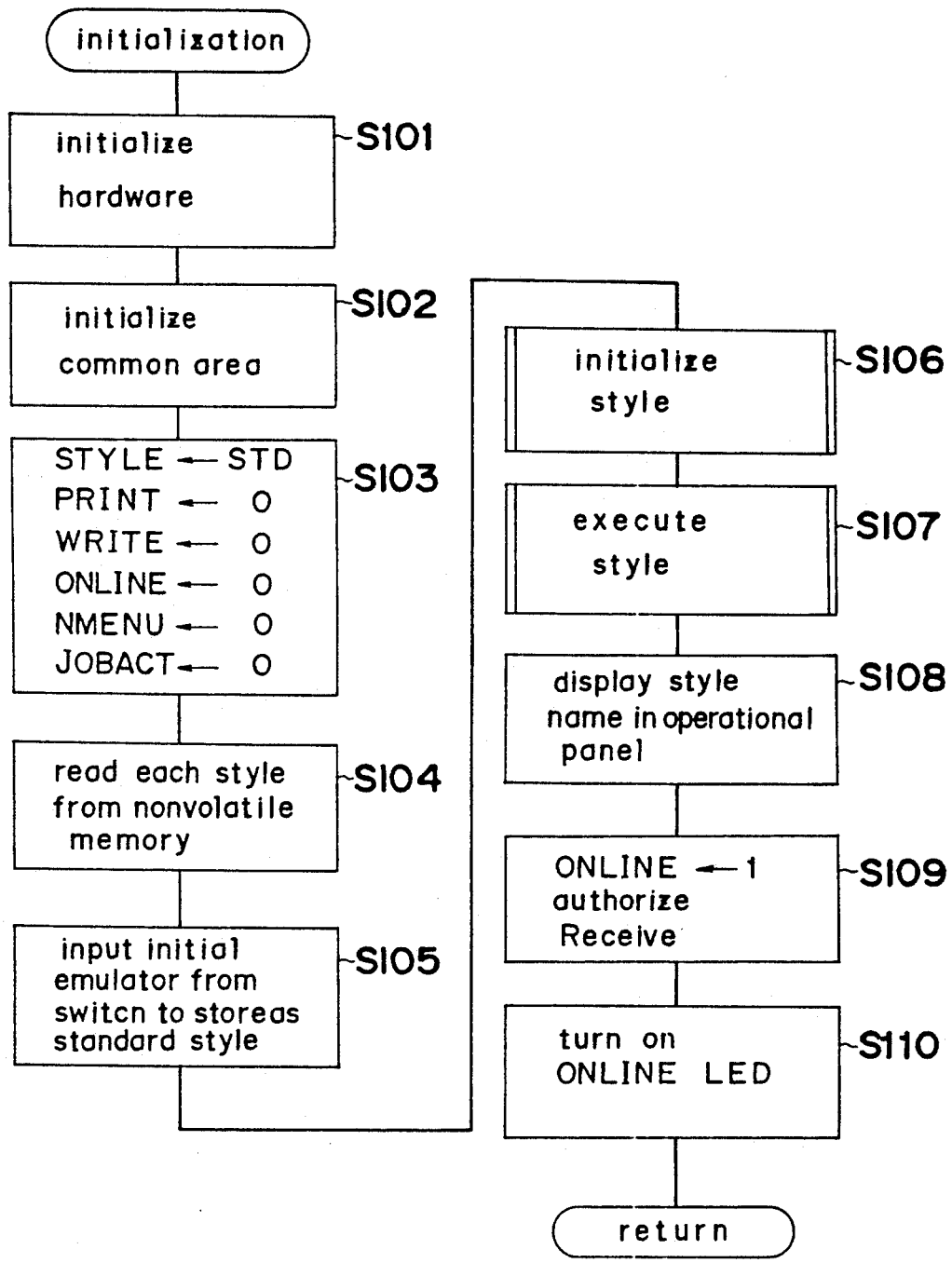
FIG. 7 is a flow chart of initialization.

FIG. 7 show the procedure of initialization (step S2). After the initialization (step S101) of hardware is carried out, the initialization (step S102) is carried out of the common information region EMTC of editing mode table. Items for initialization include paper sizes of each cassette, paper-feed cassette (current cassette), the sheet number of copy, and the like (refer FIG. 5).

Then, the initialization of main control parameters is carried out (step S103). That is, the STYLE is set as STD (=0) in order to set the initial style as standard style, a flag WRITE is set as 0 to show that data under editing are not available in the frame memory 34; a flag PRINT is set as 0 to show that data under printing with the print engine 4 are not available, a flag JOBACT is set as 0 to show that the editing in the frame memory 34 is not finished, the flag NMENU is set as 0 in order to initialize the state of the state of the message display 701, and the flag ONLINE as 0 in order to turn the state of the host interface 38 off LINE.

Then, the initialization of each style (print mode) is carried out (steps S104 to S106). First of all, information of three STYLEs (=1, 2, 3) other than the standard style stored in the nonvolatile memory 36 is read in the editing mode table (FIG. 5) (step S104). This information is the data which has been registered by a user in advance. Then, the initialization of setting value of the standard style (STYLE =0) is carried out (steps S105-S106). The standard style is not stored in the nonvolatile memory 36, and the predetermined initialization is carried out every time when the power supply is turn on. The contents of the standard style are determined by the initial values as set with a switch 37. The emulation is read from the switch 37 (step S105), and it is written in the editing mode table (FIG. 5). Then, from the initial value table of emulation (corresponding to Table 2) stored in advance, initial values such as corresponding font pitch and the like are copied in the editing mode table (step S106). In this case, the name of standard style is also written. This name is regarded as a name that can not be used for another style.

Then, an editing mode of common information EMTC is set in accordance with the standard style (step S107), in which fonts to be used for drawing, editing size in accordance with margin and the like are available.

At last, a standard style name is displayed on a message display 701 (step S108), and the input from the host interface 38 is authorized to the data processing device (A, B, and C) (step S109), and the ONLINE LED 705 is turned on (step S110).

Figure 8:
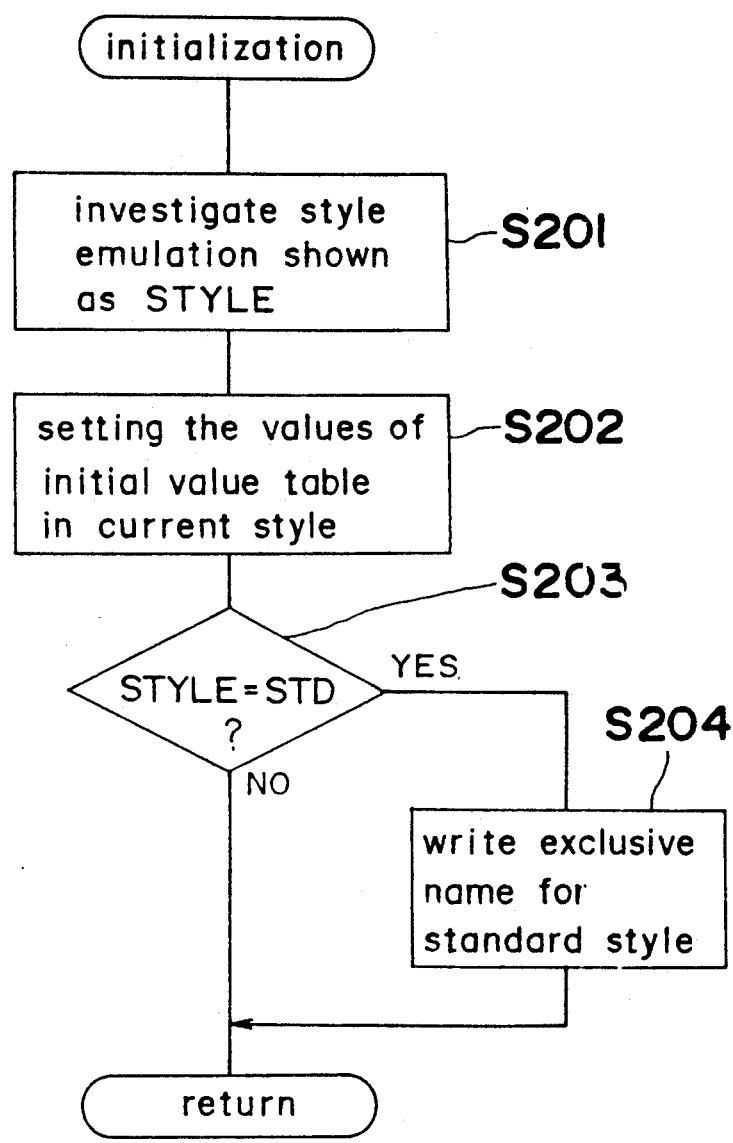
FIG. 8 is a flow chart of the initialization of style.

FIG. 8 shows a flow of initialization (step S106 in FIG. 6 and step S306 in FIG. 10) of style information in the editing mode table.

First, an emulation code as previously set in the editing mode table (refer FIG. 5) is investigated (step S201). The initial values are set in the present style (current style) with reference to the initial value table (corresponding to Table 2) stored in the processing device 31 (step S202). In this case, the name of style is not changed.

Then, it is checked whether it is a standard style or not (step S203), and an exclusive name is written in the style name in case of the standard style (step S204).

FIG. 9 shows a flow of execution of style (step S107 in FIG. 6 and step S307 in FIG. 10) which performs setting of parameters practically used for edit processing by analyzing the values as set in the style. The processing of executing this style varies with the emulation of selected style (current style STYLE). This is because the function varies with the emulation to which it corresponds. Then, an analysis is carried out by confirming with the Table of functions for each emulation (Table 1).

First, the emulation of current style is read from the editing mode table (step S222). And, the address of the emulation is calculated from the Table of functions (Table 1) (step S222).

Next, it is decided whether the font pitch of the selected emulation is authorized or not (step S223). If it has been authorized, a font is selected according to its pitch (step S224), and then it is decided whether the font point of the selected emulation is authorized or not (step S225). If it has been authorized, a font is selected from its font point (step S226).

Then, it is decided whether the character set of the selected emulation is authorized or not (step S227), and if it has been authorized, the font is selected from the character set (step S228).

Next, it is decided whether the margin of selected emulation is authorized or not, and if it has been authorized, the margin is set (step S232).

Then, it is decided whether the printing offset of the selected emulation is authorized or not (step S233), and if it has been authorized, its offset is set (step S234).

At last, it is decided whether the line thickness of the selected emulation is authorized or not (step S235), and if it has been authorized, its line thickness is set (step S236), and then the flow returns to the main flow.

Figure 10A:
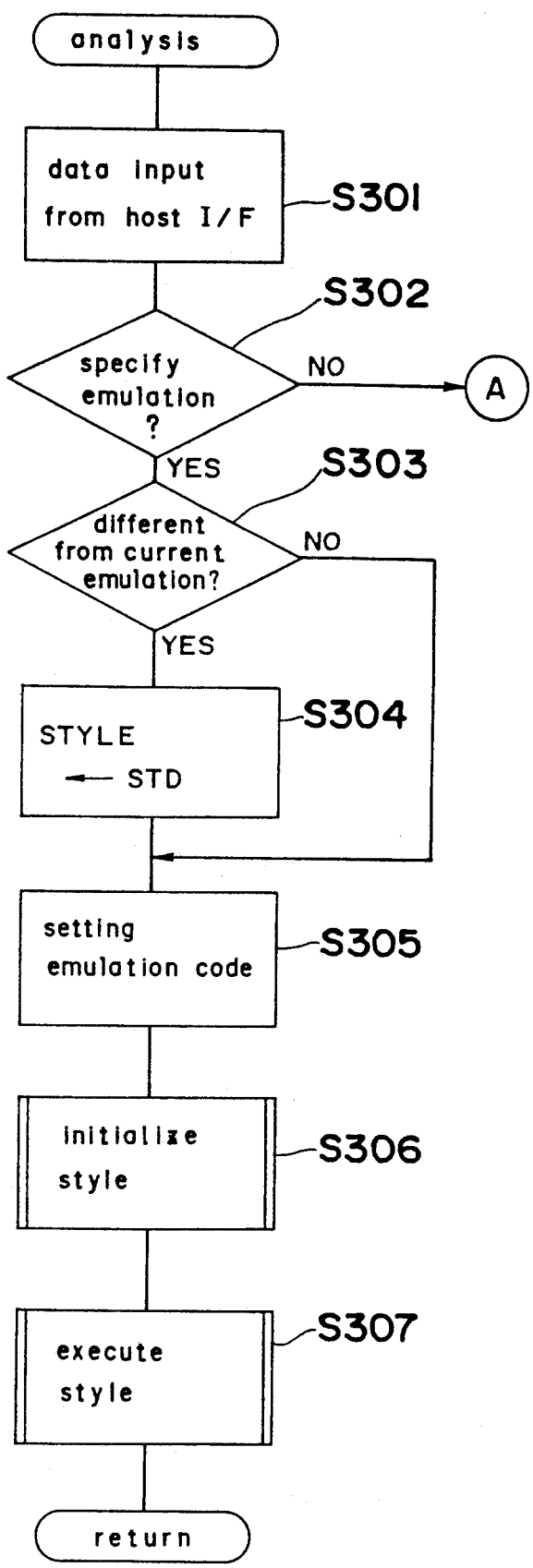
FIGS. 10 (a) and (b) are a flow chart of the analysis of input data.
Figure 10B:
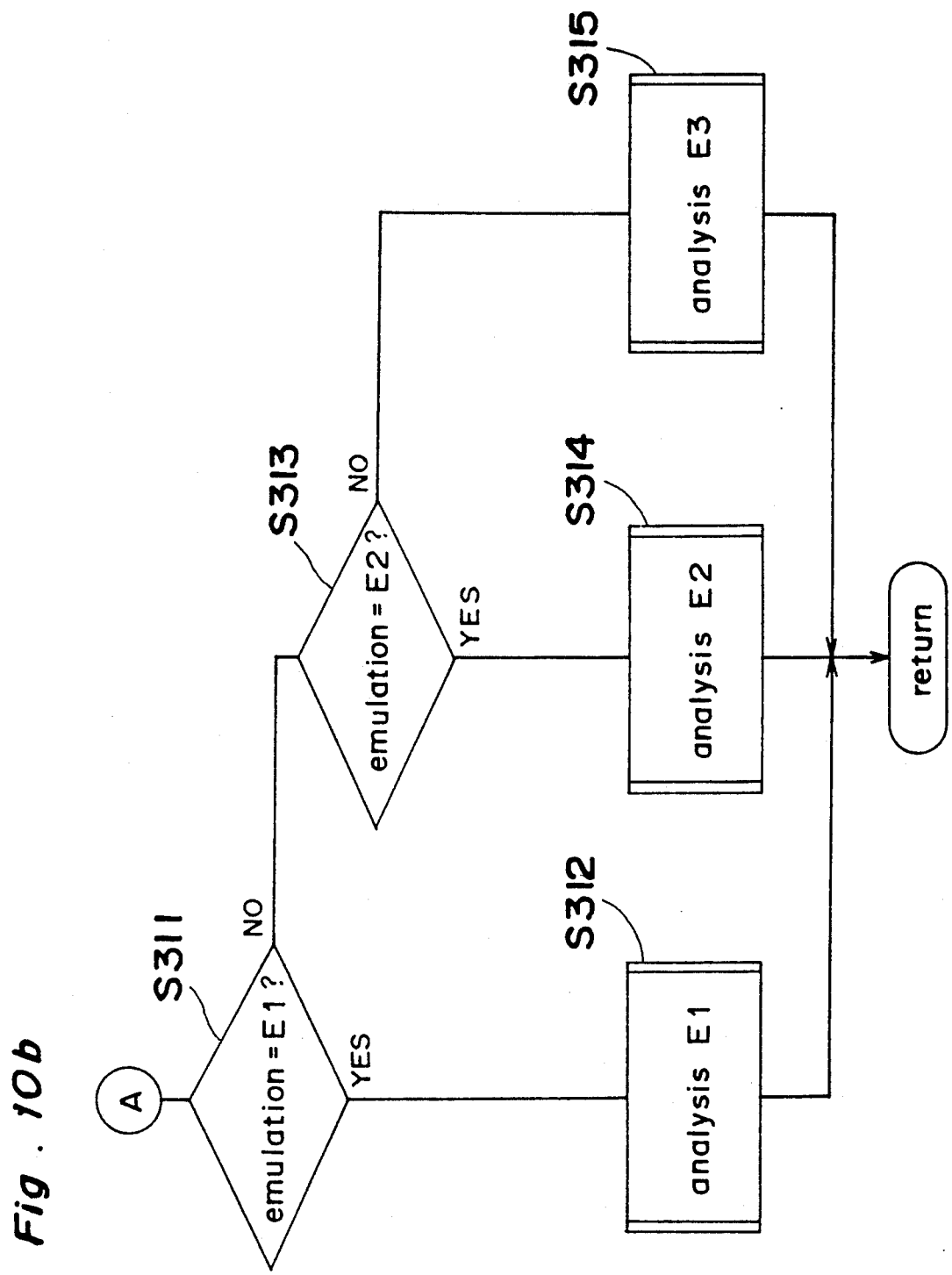

FIGS. 10 (a) and (b) show a flow (step S5 in FIG. 6) for analyzing the input data received from the data processing devices (host) 1A, 1B, and 1C. The analysis of the input data is carried out by a unit of page, and the processing is not carried out when the previous page is under printing with the engine 4. Input data include printing data and commands which differ in format and meaning for each emulation and one emulation assigning command which is common to all the emulations.

First, data are inputted from the host interface 38 (step S301) In this embodiment, because the emulation can be assigned from data processing devices 1A, 1B, and also 1C, an emulation assigning data are often inputted. If the input data is an emulation assigning data (YES at step S302), it is decided whether or not the currently executed emulation is changed (step S303). If the emulation is not changed (NO at step S303), the current emulation mode is set (step S305), the current style is initialized in accordance with the emulation code (step S306), and the updating of the editing parameters is carried out (step S307). When the emulation is switched remotely by an input from the data processing devices (YES at step S303), the analysis conditions as set previously with the operational panel in the editing mode table may be broken, and troubles may be caused. Therefore, in order to prevent such troubles beforehand, the style is switched to the standard style (STD) (step S304). And, the flow proceeds to step S305 and the assigned emulation code is set, and then the setting values of each item (analytical conditions) of the standard style (STD) is initialized in accordance with the initial value table (Table 2) (step S306), and the common information in the editing mode table is set (step S307).

If the input data is an emulator assigning command (YES at step S302), the common processing as explained above is carried out (steps S303—S306), whereas if the input data is another command, the processing is carried out individually for every emulation (steps S312, S314, and S315).

Next, a modified example of analyzing procedure will be explained below. As shown in FIGS. 16 (a) and (b), a data is inputted from the host interface 38 (step S301). If the input data from the data processing devices 1A, 1B, or 1C is decided to be an emulation-assigning data (YES at step S302), it is decided whether the emulation is changed from the one under execution (step S321). If the emulation is not changed, differently from the example of FIG. 10, the updating is made immediately in the editing parameters (step S325). In this manner, since the set values as previously set by a user with the operational panel 7 are set, the user who has set the values assigned from the host can use the printer conveniently.

On the other hand, if the emulation is switched remotely (step S321) by inputting from a data processing device, in the same manner as shown in FIG. 10, the style must be switched beforehand so as to prevent troubles (step S322). And then, assigned emulation code is set (step S323), and the style of standard mode table is initialized in accordance with the initial value table (Table 2) (step S324). Then, the common information in the editing mode table is set (step S325).

If the input data is a command other than the emulator-assigning command, as shown in FIG. 16 (b), it is individually processed for each emulation (to be decided at steps S311 and S313) in the same manner as shown in FIG. 10 (b) (steps S312, S314, and S315).

FIGS. 17 (a) and (b) show another modified embodiment of the procedure for analyzing the input data received from the data processing devices (host) 1A, 1B, and 1C. The analysis of input data is carried out by the unit of page, and no processing is carried out if the preceding page is under printing with the print engine 4.

When the input data received from the host interface 38 (step S301) is an emulation-assigning data (YES at step S302), it is decided next if the emulation is changed from the emulation under execution (step S361).

If the emulation is changed (YES at step S361), it is decided next whether the style which contains the assigned emulation is registered or not in the editing mode table (step S362). If the assigned emulation is present in other styles, the corresponding style is set in STYLE (step S367), and then updating in the editing parameters is carried out (step S366).

If the style which contains the assigned emulation is not present in other styles (No at step S362), the current style is switched to the standard style (STD) (step S363), and the assigned emulation code is set (step S364). Then, the initialization (step S365) is made for the current style in accordance with the emulation code, and the updating to the editing parameters is made (step S366). Then, the flow returns to the main flow.

If the emulation is not switched remotely by the input received from the data processing devices (No at step S361), it is decided whether the style is the standard style (STD) or not (step S368). If it is the standard style, the initial values in accordance with emulation is set in the standard mode table in accordance with the initial value table (Table 1) (step S365), the setting in the common information of style is carried out (step S346), and then the flow returns to the main flow. If it is not the standard style (No at step S347), the current setting values are set as it is in the common information of style (step S366), and the flow returns to the main flow.

If input data is an emulator-assigning command, the common processing is carried out as mentioned above. However, if the input data is another command, individual processing is made for every emulation (evaluated at steps S311 and S313) (FIG. 17 (b), steps S312, S314, and S315].

Figure 11A:
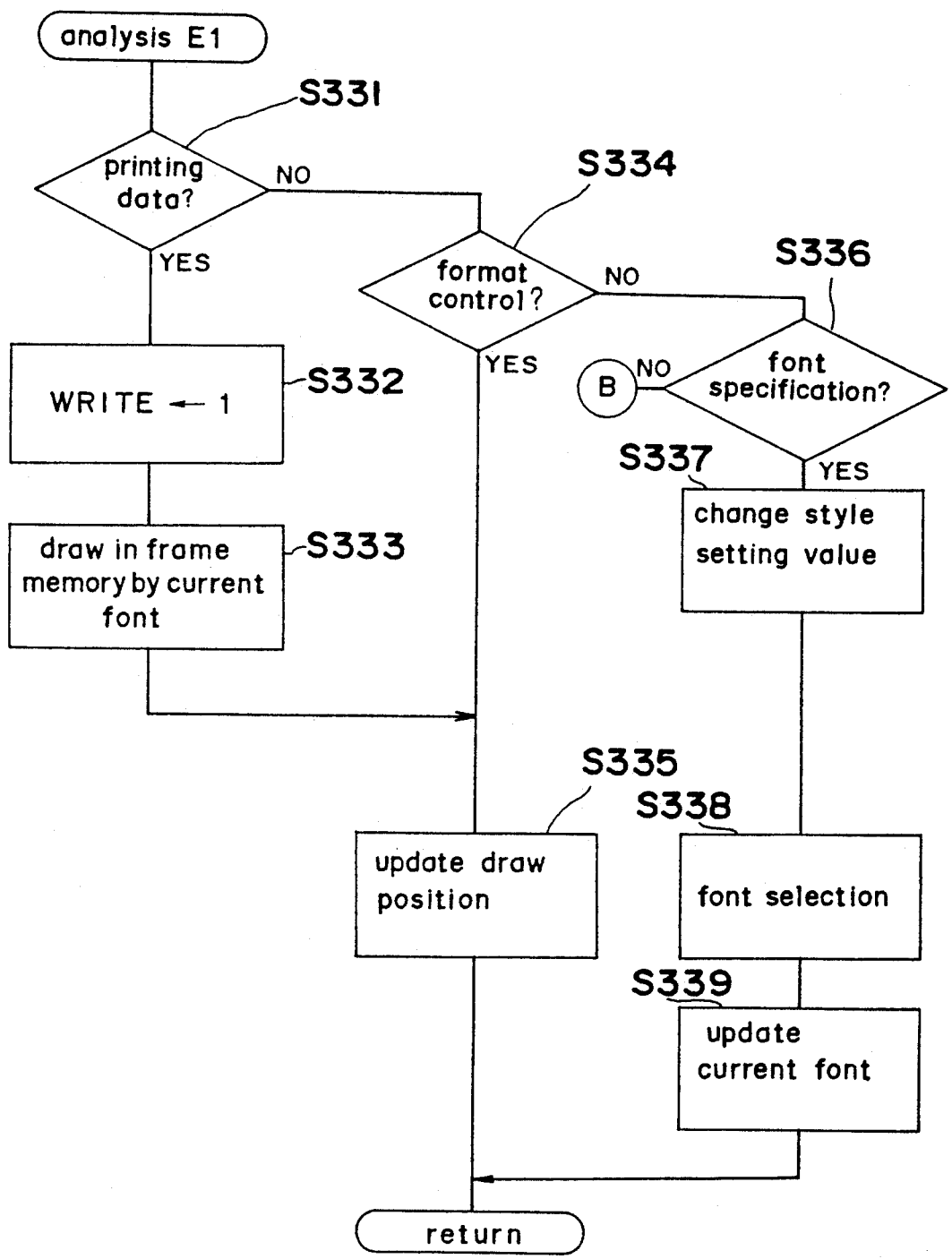
FIGS. 11 (a) and (b) are a flow chart of the analysis of emulation E1.
Figure 11B:
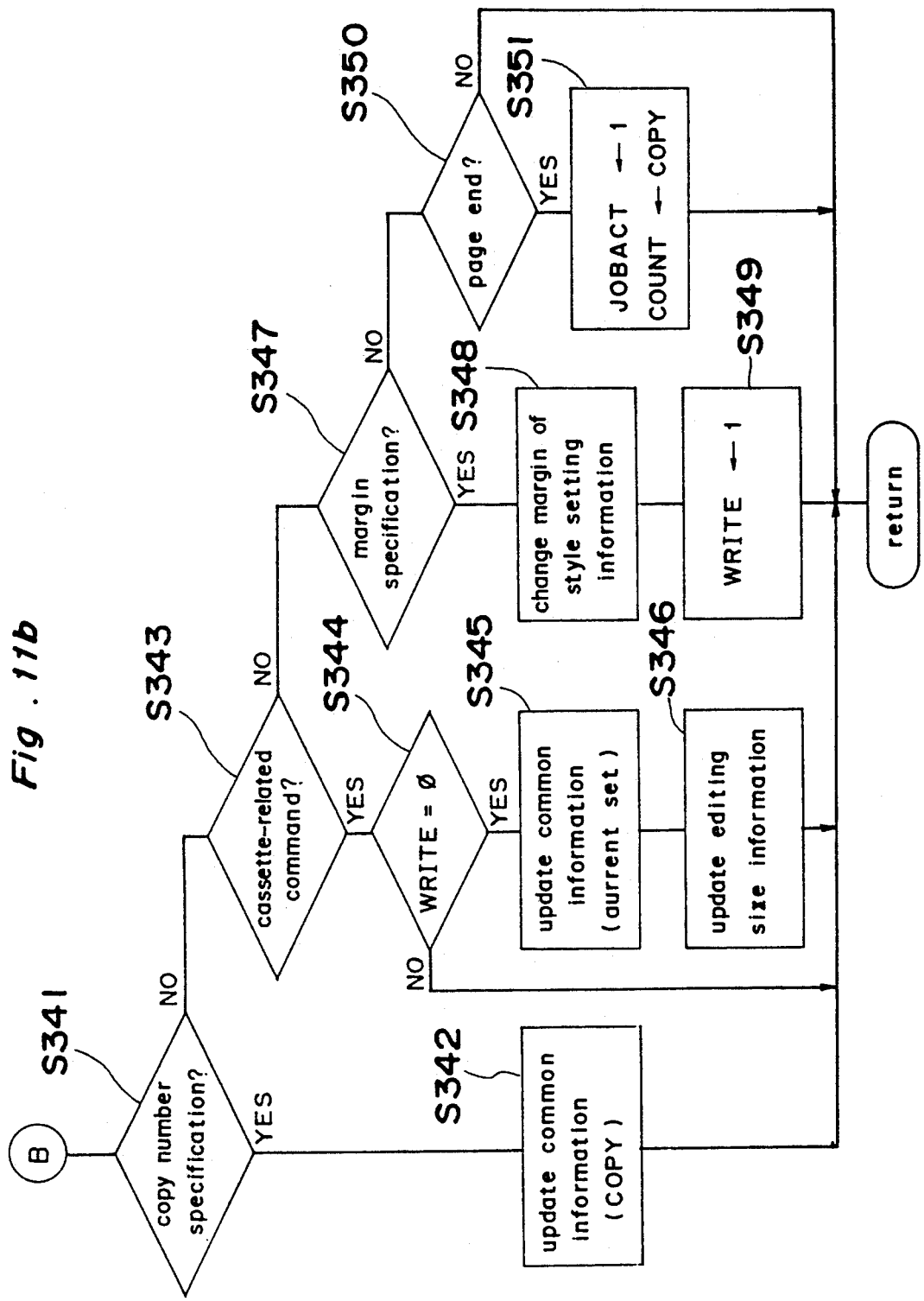

FIGS. 11 (a) and (b) show an analytical procedure (step S312) for emulation E1. Input data are broadly classified into printing data (YES at step S331) and other commands (No at step S331). If it is a printing data, first, a flag WRITE showing the start of editing in the frame memory 34 is set (step S332), and the data is given to the drawing device 35 for drawing to the frame memory 34 with the current font now being selected (step S333). And the drawing (printing) position is updated in preparation for the following input data (step S335), and then the flow returns to the main flow.

If it is a format-control command for assigning the drawing position (YES at step S334), only change in drawing position is carried out (step S335), and then the flow returns to the main flow.

If the data is a font-assigning command (YES at step S336), contents of the editing mode table which correspond to the current style are changed in accordance with the command (step S337), the font which corresponds to the conditions is selected (step S338), the current font is updated in preparation for next drawing (step S339), and then the flow returns to the main flow.

If the data is the number of copies (YES at step S341), the number of copies (COPY) in the common information is changed (step S342), and then the flow returns to the main flow.

If the data is a cassette switch command (step S343), it is decided next if flag WRITE=0 (step S344). If the decision is YES or only if write in the frame memory 34 or margin change to be mentioned later (step S348) are not carried out, the current cassette of common information is changed (step S344), and the initialization of editing size in accordance with the paper size of new cassette is carried out (step S347), and then the flow returns to the main flow.

If the data is a margin-assigning command (YES at step S347), among the style setting information, the margin is changed (step S348) and in the same manner as drawing the printing data, the change of cassette is inhibited (step S349) and then the flow returns to the main flow.

If the data is decided to be the page end command (YES at step S350) which shows the end of editing of a page, and the number of copies is set in a copy control counter COUNTER, print request (JOBACT=1) is sent (step S351), and the flow returns to the main flow.

Figure 15:
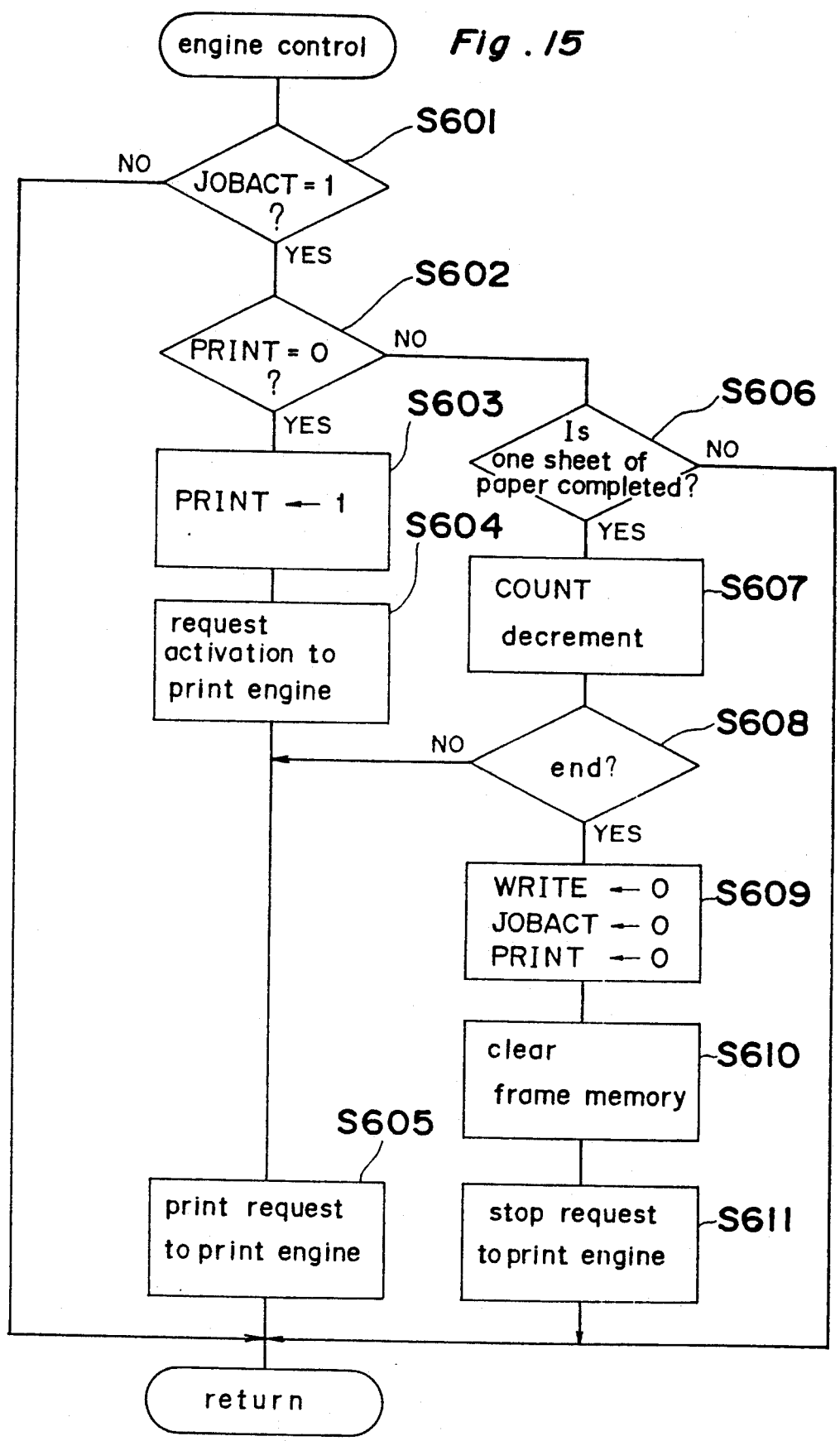
FIG. 15 is a flowchart of engine control.

The processing to be performed thereafter is carried out with the engine control processing (FIG. 15).

Figure 12A:
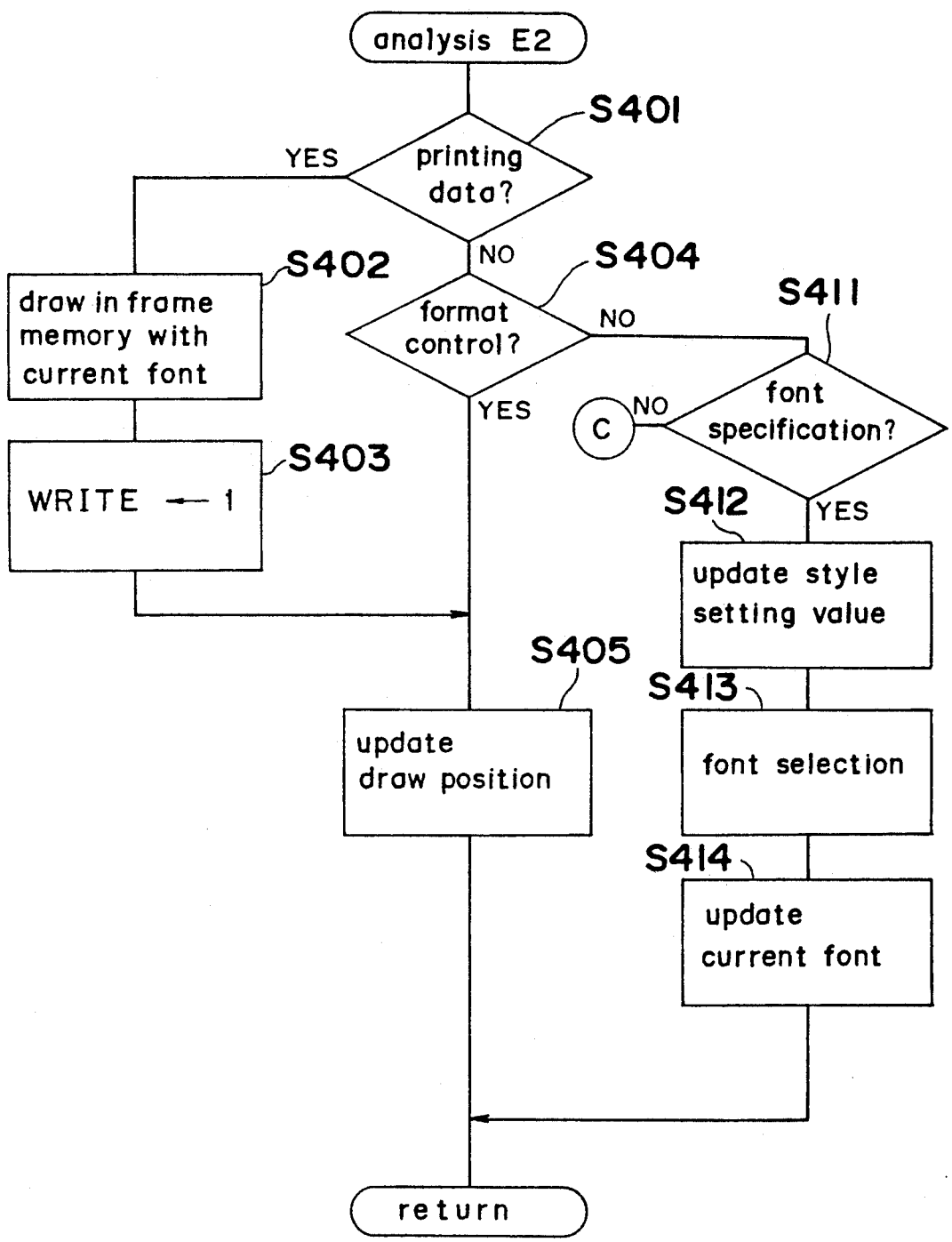
FIGS. 12 (a) and (b) are a flow chart of the analysis of emulation E2.
Figure 12B:
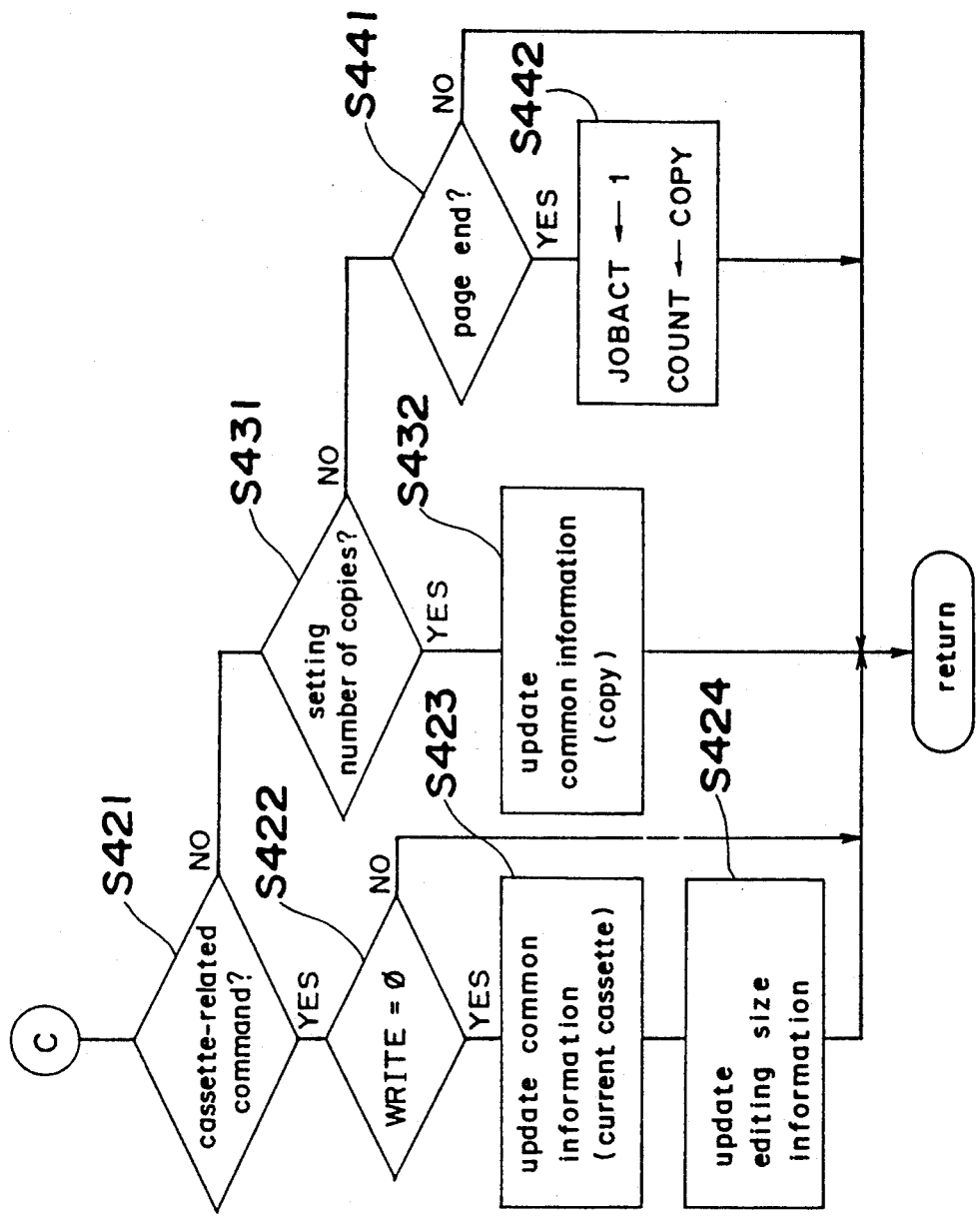

FIGS. 12 (a) and (b) show the analytical procedure (step S314) of emulation E2. Input data is broadly classified into printing data (YES at step S401) and commands (NO at step S401).

If the input data is decided to be printing data (YES at step S401), first, a flag showing the start of editing in the frame memory 34 is set (step S402), data are inputted in the drawing device 35 in order to draw in the frame memory 4 with use of the current font selected (step S403), and then a drawing (printing) position is being updated in preparation for the next input data (step S405), and then the flow returns to the main flow. If the data is decided to be format control command for assigning a drawing position (YES at step S404), only the drawing position is changed (step S405), and the flow returns to the main flow.

If the data is decided to be a font assigning command (YES at step S411), contents of the editing mode table corresponding to the current style are changed in accordance with the command (step S412), the font which corresponds to the conditions is selected (step S413), the current font is updated in preparation for next drawing (step S414), and the flow returns to the main flow.

If the data is decided to be the cassette switch command (YES at step S421), it is decided next if WRITE=0 (YES at step S422), or if write in frame memory (step S403) has not yet been made. If the decision is YES, the current cassette in the common information is changed (step S423), the initialization is carried out of editing size in accordance with the paper size of new cassette (step S424), and then the flow returns to the main flow.

If the data is decided to be the copy number assigning command [YES at step S431], copy in the common information is updated (step S432), and the flow returns to the main flow. If the data is decided to be the page end command (YES at step S441) which shows the end of the editing of one page, the number of copies is set in a copy control counter COUNT, and print request (JOBACT=1) is carried out (step S442). Then the flow returns to the main flow.

The processing thereafter is carried out by the engine control processing (FIG. 15).

Figure 13A:
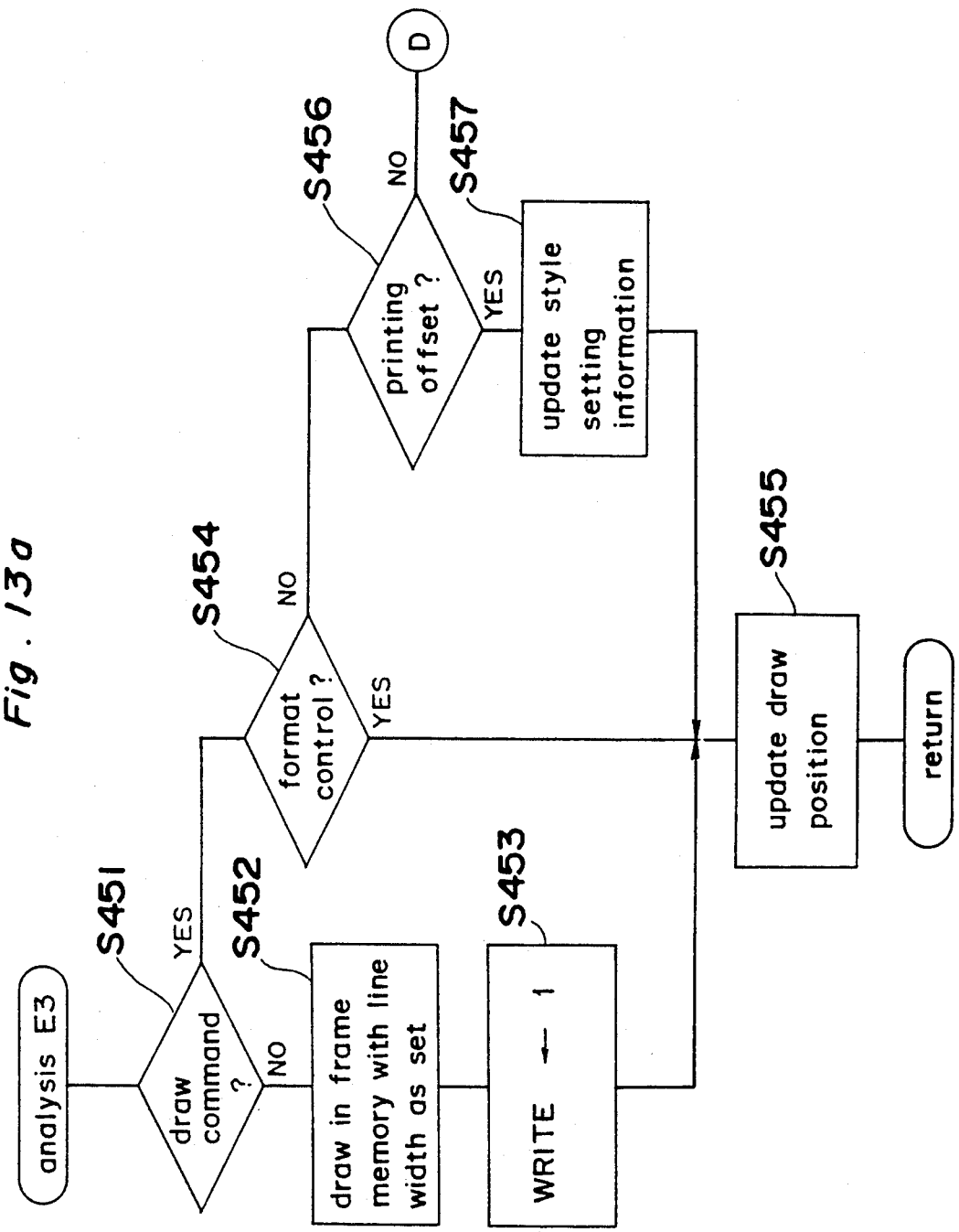
FIGS. 13 (a) and (b) are a flow chart of the analysis of emulation E3.
Figure 13B:
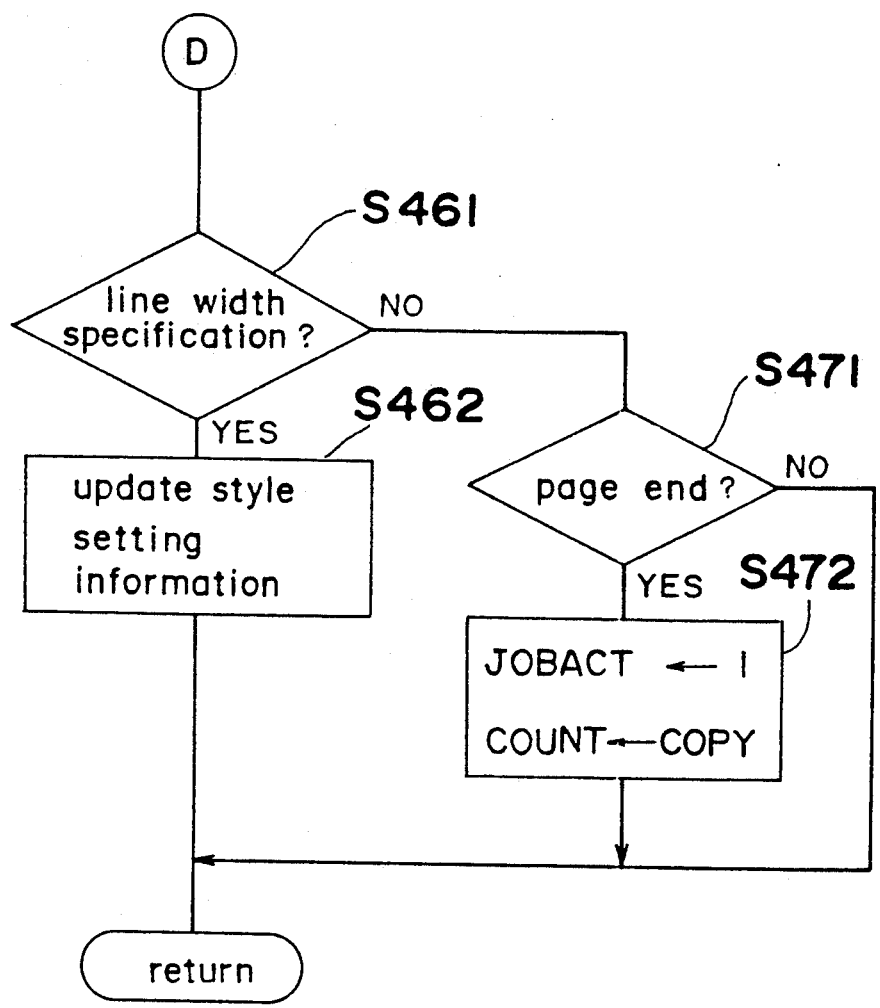
Figure 14A:
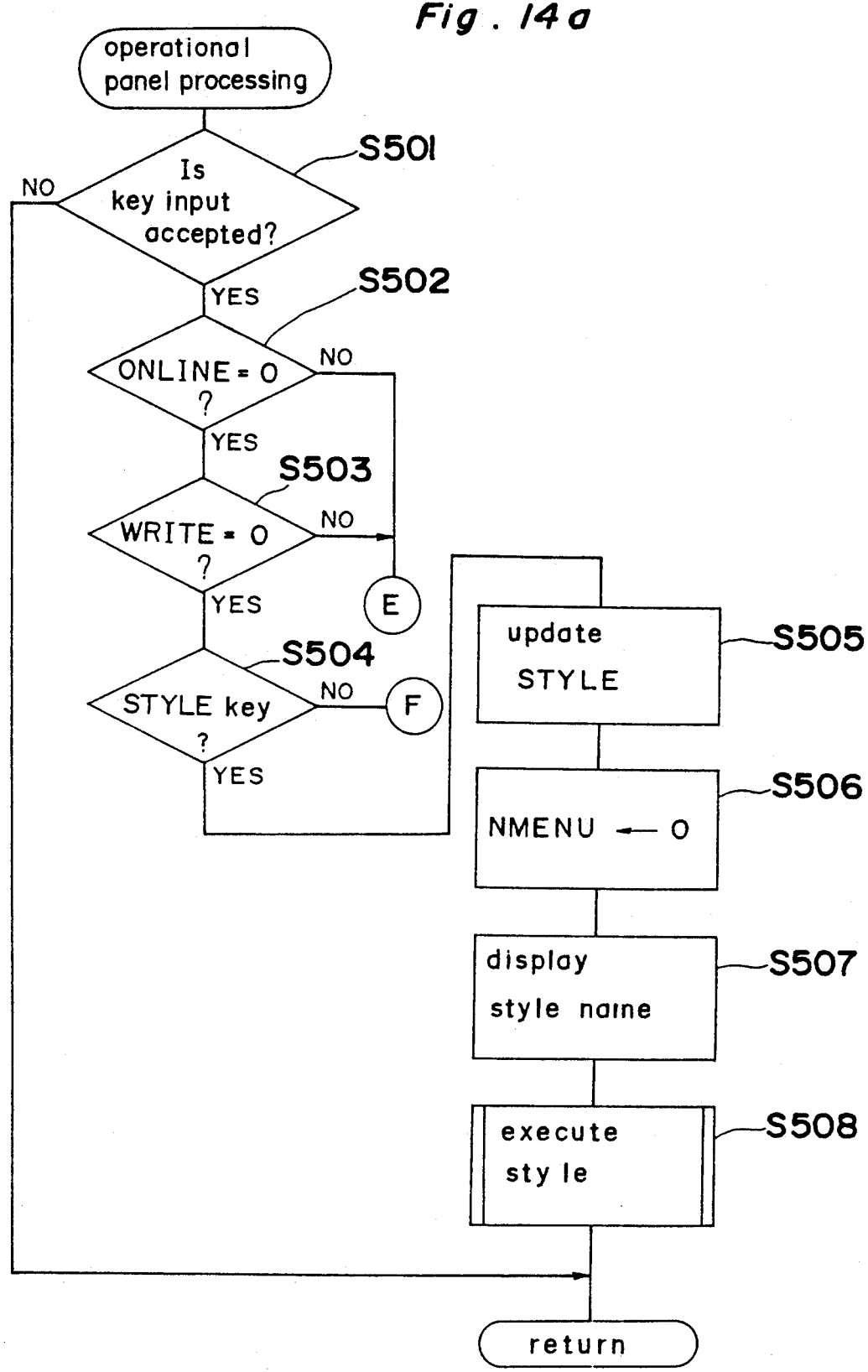
FIGS. 14 (a) to (b) are a flow chart of the processing with operational panel.
Figure 14B:
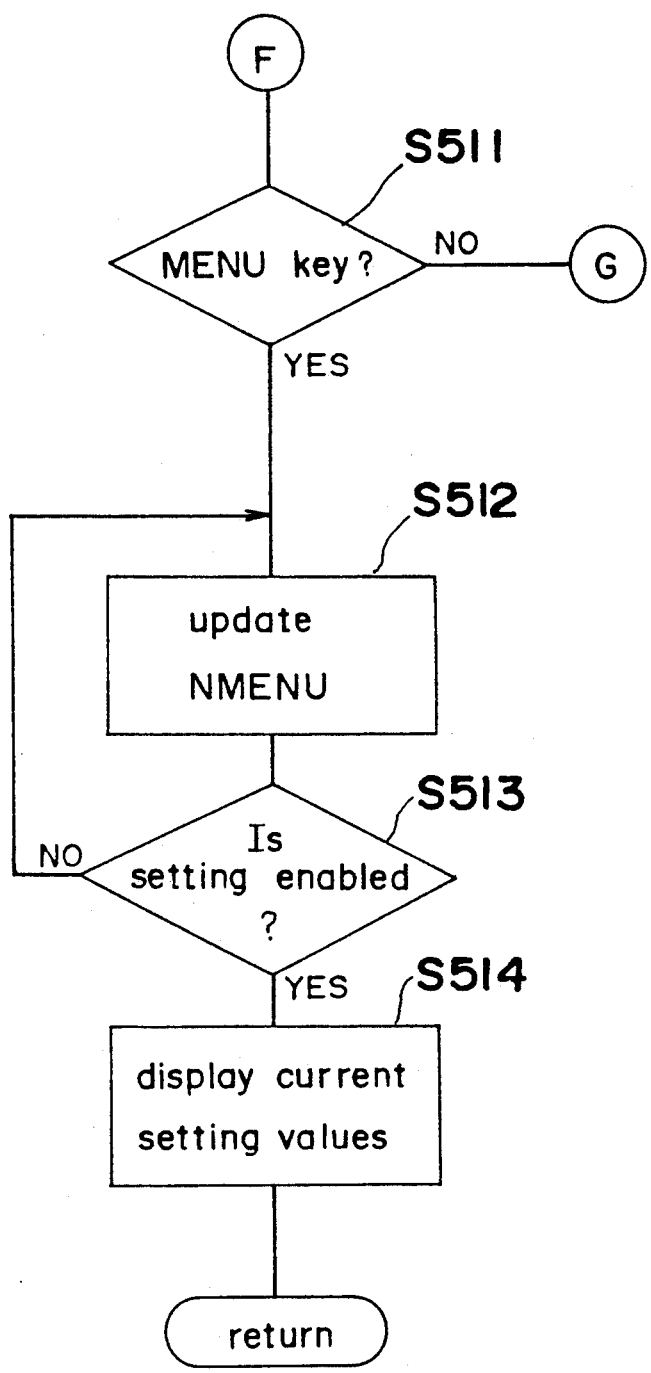
Figure 14C:
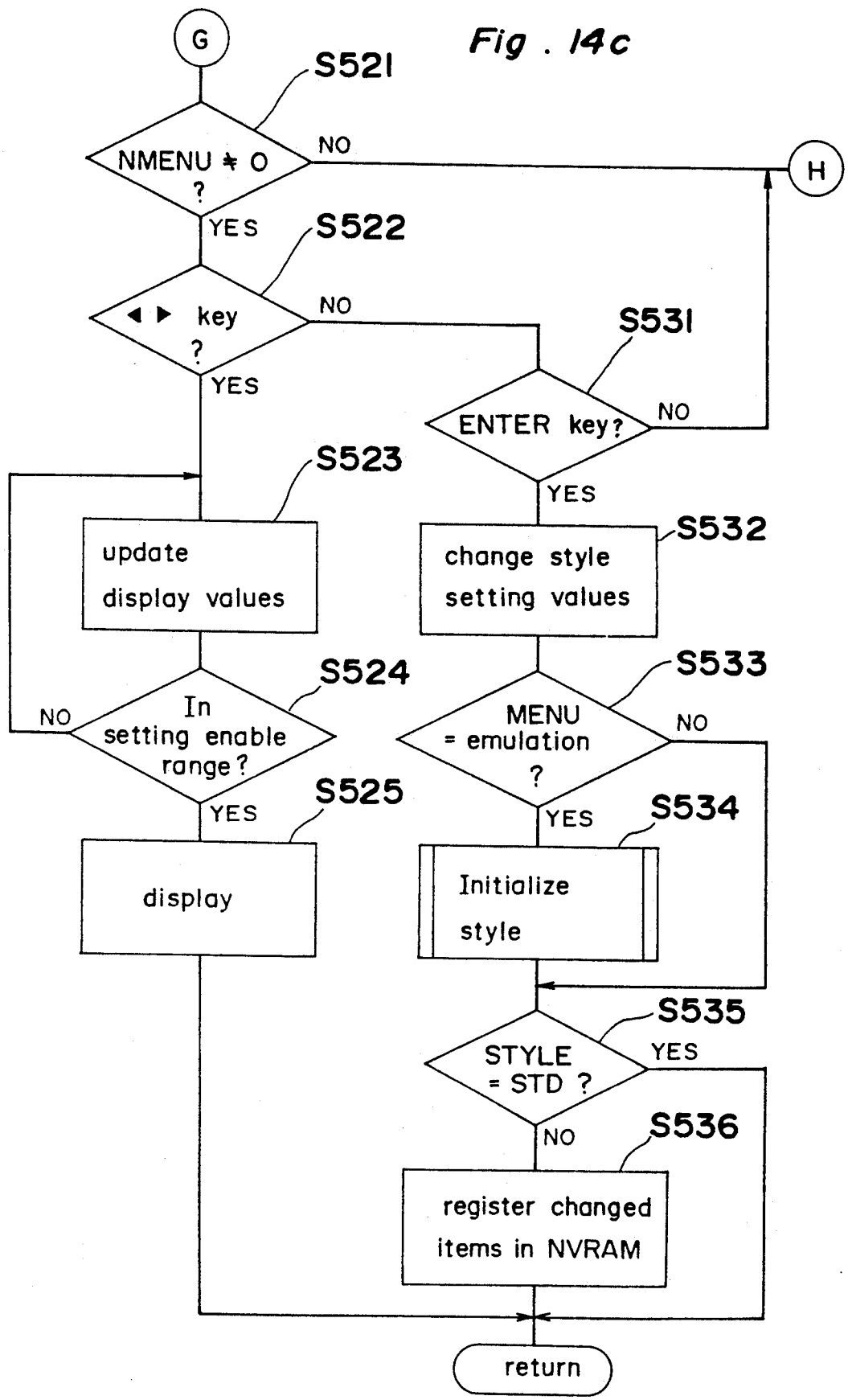
Figure 14D:
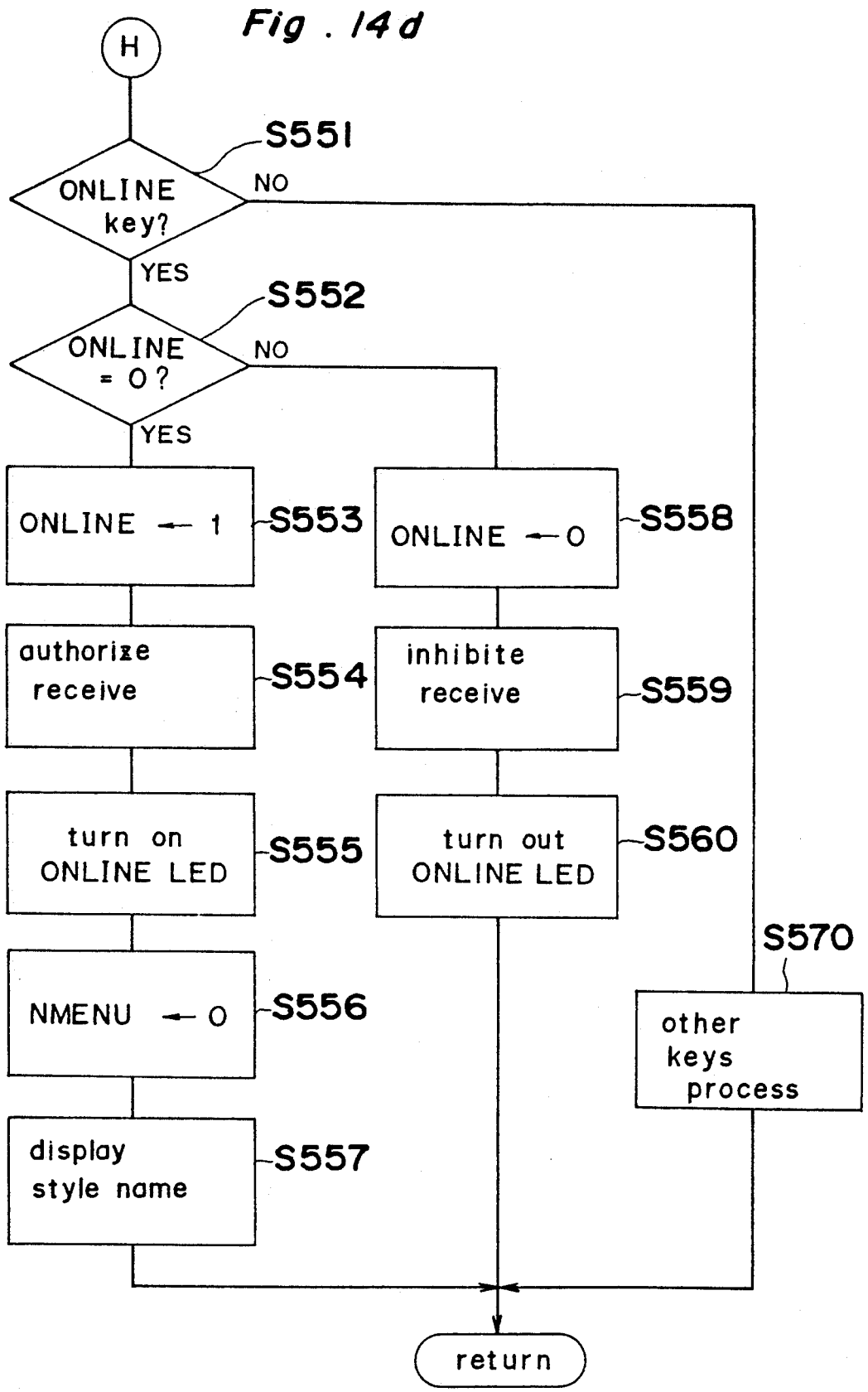

FIGS. 13 (a) and (b) show the analytical procedure of emulation E3 (step S315) for CAD.

If the input data is decided to be a drawing command (YES at step S451), the data is outputted to the drawing area 35 in order to draw in the frame memory 34 with the line thickness now being set (step S452), and a flag showing the start of editing in the frame memory 34 is set (step S453). And the drawing position is updated in preparation for next input data (step S455), and the flow returns to the main flow. Likewise, if the data is decided to be format control command for assigning the drawing position (YES at step S454), only drawing position is changed (step S455), and then the flow returns to the main flow.

If the data is decided to be printing offset (YES at step S457), it is set in the assigned printing offset (step S458), the drawing position is updated (step S455) in preparation for the next input data, and then the flow returns to the main flow.

If the data is decided to be line thickness assigning command (YES at step S461), an assigned line thickness is set (step S462), and then the flow returns to the main flow.

If the data is decided to be page end command (YES at step S471) showing the end of editing of one page, the number of copies is set in a copy control counter COUNT, and a print request (JOBACT=1) is carried out (step S472), and then the flow returns to the main flow.

The processing thereafter is carried out by the engine control processing (FIG. 15).

FIGS. 14 (a) to (d) show a flow of processing (step S6 in FIG. 6) of the operational panel 7. Among the keys on the operational panel 7, STYLE key 714, MENU key 715, set value changing keys 716 and 715 and ENTER key 718 are used for changing the editing mode, which means that even if a key-input is accepted (YES at step S501), the processing is not performed if the key-input is made during the editing (WRITE =1 and NO at step S503) of data in the frame memory 34 and during the input of data from the host ( ONLINE =1 and NO at S502).

If a data is not inputted from the host (YES at step S502) and also data editing is not being made in the frame memory 34 (YES at step S503), first, style-related keys are processed. In this embodiment, although of emulation can be changed with the operational panel 7, while a style is set by grouping various settings so that the setting by every individual application can be conveniently carried out by a user with the STYLE key 714.

If STYLE key 714 is decided to be pushed (YES at step S504), the current style (STYLE) in the common information is updated (step S505). The style is rotated repeatedly in the following order: standard style (STYLE code=0)→style A (STYLE code=1)→style B (STYLE code=2)→style C (STYLE code=3)→ standard style→. The menu code shown next are initialized in style name (=0) (step S506), and the style name as stored in the style setting table is displayed (step S507). And, the editing mode is changed (step S508) in accordance with newly selected style, and then the flow returns to the main flow.

When the MENU key 715 is pushed down (YES at step S511), the MENU code (=NMENU) is updated (step S512), and the menu of items corresponding to the MENU code (for instance, font pitch) is decided to be able to be displayed or not in the current emulation mode with the Table of functions corresponding to each emulation (Table 1) (step S513). If it is decided not to be able to be displayed, the flow returns to step S513, and the following menu is checked. In this case, the style name is passed. If the decision at step S513 is YES, the current set value of the menu are read from the editing mode table and are displayed (step S514), and then the flow returns to the main flow. There is also a menu for emulation among menus, and the emulation can be changed with the operational panel 7.

When a changing key (◁, ▷) 716 or 717 is pressed down (YES at step S522) during display of the values in the menu (NMENU≠0, and YES at step S521), it is decided whether or not the value lies within the possible range to be set for the item (for instance, printing offset) of the corresponding emulation (step S524). If it is not a possible value to be set, the flow returns to step S523, and the next value is checked. For instance, in case the displayed value is 30 and the possible setting range is +30 to −30, if a key 716 for a change in the increasing direction (◁) is pressed down, the value becomes 31 and it is impossible to set. So it is changed to −30 and it is checked whether the value lies within the possible setting range or not. Contrary to this, pressing down a decreasing key (▷) 717 when the value is −30, the value is −31 impossible to be set, and then it is changed to +30. If a right value is determined in the possible setting range, it is displayed (step S525), and then the flow returns to the main flow.

In this manner, by making reference to the Table of functions corresponding to each emulation (Table 1), the setting values are changeable only when the setting is possible in the corresponding emulation. As the table of functions corresponding to each emulation stores items that can be set and a range allowed by every emulation on the operational panel 7 in advance, troubles will not arise even if the emulation is switched.

When ENTER key 718 is pressed down (YES at step S531), the value now displayed is written in the editing mode table (step S532). If the menu is on emulation (YES at step S533), the initial values of each setting item of the corresponding emulation are read form the initial value table (Table 2), and are written in the editing mode table (step S534). Furthermore, when the style is not a standard style (No at step S535), the values are also stored in a nonvolatile memory 36 (step S536), and then the flow returns to the main flow.

FIG. 14 (d) shows the processing of the ONLINE key 713 among keys other than the style-related keys. The ONLINE key 713 switches authorization/inhibition of the data input from a data processing device at every time the ONLINE key 713 is pressed down. The state is controlled with a flag ON-LINE. When the ONLINE key 713 is pressed down (YES at step S551), if an input has been inhibited (the state of off-line) (ON-LINE =0, and YES at step S552), the state is switched to on-line or the flag ONLINE is set as 1 (step S553). Then, receive is authorized (stop S554), the ONLINE LED 705 is turned on (step S554), the flag NMENU is reset to 0 (step S556), the style name is displayed on the message display 701 (step S557), and the flow returns to the main flow. On the other hand, if the input is not authorized (off-line state) (No at step S552), it is switched to the off-line. That is, the flag ONLINE is reset as 0 (step S558), receive is inhibited (step S559) followed by turning off of the ONLINE LED 705 (step S556), and then the flow returns to the main flow.

For the processing of the other key-inputs, explanation is omitted.

FIG. 15 shows a flow (step S7 in FIG. 6) which outputs the contents of the frame memory 34 to the print engine 4 (step S7 in FIG. 6). A series of print sequences is started with a print request (JOBACT=1) (step S601). When the print request is first detected (PRINT=0, YES at step S602.), an activation request is outputted through an engine interface 39 to the print engine 4 (step S604). Furthermore, a request is sent to output one sheet of image (step S605), and then the flow returns to the main flow. As mentioned above, in this embodiment, the contents of the frame memory 34 is transferred through the engine interface 39 to the print engine 4 in the procedure in which details are neglected to be explained here, and hard copy is carried out.

When printing one sheet of paper is completed (YES at step S606), a control counter for the number of copies is subtracted(step S607). If the copy has been finished (YES at step S608), various flags WRITE, JOBACT and PRINT are reset (step S609), the frame memory 34 is cleared (step S610), a stop request is outputted to the print engine 4 (step S611), and then the flow returns to the main flow. If the printing has not been finished (No at step S608), a print request of the next paper is outputted (step S605), and then the flow returns to the main flow.

With a printer control apparatus of the present invention, in a printer provided with a plurality of analytical means (emulations), users can register analytical conditions (print mode) containing codes which show analytical means for every applications. By assigning the analytical conditions, the items for every application can be simply set.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A printer, comprising:
    printing means for forming an image on a paper;

setting means for setting independently a plural kind of analytical conditions for printing information;

a plurality of store means each for storing a set of setting values which correspond to the analytical conditions of said plural kind of printing information set by said setting means;

first selective means for selecting one among said plurality of said store means;

a plurality of analytical means each for analyzing inputted printing information in accordance with analytical conditions for printing information stored in the store means selected by said first selective means based on respective inherent protocol;

second selective means for selecting analytical means to be used among a plurality of analytical means; and control means for controlling said printing means in accordance with the printing information analyzed by the selected analytical means;

wherein said first selective means selects a predetermined store means among said plurality of store means in response to the selection of analytical means by said second selective means.

2. A printer according to claim 1, further comprising;
initializing means for initializing to a predetermined values the contents stored in said predetermined store means selected by said first selective means in response to the selection of analytical means by said second selective means.

3. A printer provided with a plurality of emulation modes, comprising;
printing means for forming images on a paper;
setting means for setting independently a plural kind of analytical conditions for printing information;
a plurality of store means each for storing a set of setting values which correspond to said plural kind of analytical conditions for printing information set by said setting means;
first selective means for selecting one among said plurality of store means;
a plurality of analytical means each for analyzing inputted printing information in accordance with the analytical conditions for the printing information as stored in the store means selected by said first selective means based on respective inherent protocol which correspond to one among said plurality of emulation modes;
second selective means for selecting emulation mode to be used among said plurality of emulation modes; and
control means for controlling said printing means in accordance with the printing information analyzed by the analytical means which correspond to the emulation mode selected by said second selective means;
wherein said first selective means changes the selection of said store means in response to the change in the selection of emulation mode by said second selective means.

4. A printer according to claim 3, wherein said first selective means selects a predetermined store means irrespective of the contents of an emulation mode newly selected when the emulation mode is selected by said second selective means.

5. A printer according to claim 4, further comprising;
initializing means for initializing the contents stored in said predetermined store means which are selected by said first selective means, in response to the change in emulation mode by said second selective means.

6. A printer according to claim 3, wherein
said plurality of store means each corresponds to one of said plurality of emulation modes, and
said first selective means selects store means corresponding to a newly selected emulation mode in response to the change in emulation mode by said second selective means.

7. A printer according to claim 6, wherein
said first selective means selects a predetermined store means irrespective of the contents of a newly selected emulation mode when emulation mode is changed by said second selective means if store means which corresponds to the newly selected emulation mode is not available.

8. A printer according to claim 6, wherein
said first selective means, selects predetermined store means irrespective of the contents of the newly selected emulation mode and said initialization means initialized the contents stored in the predetermined store means to the predetermined values when emulation mode is changed by said second selective means, if store means which corresponds to a newly selected emulation mode is not available.

9. A controller for printer comprising:
printing means for forming images on a paper;
a plurality of store means for analytical conditions, each for storing a set of setting values which correspond to a plural kind of analytical conditions for printing information;
selective means for selecting one among said plurality of store means for analytical conditions;
program store means for storing a plurality of analytical program for analyzing inputted printing information;
control means for analyzing said printing information according to the analytical conditions of printing information stored in store means for the analytical condition selected by said selective means by using one of said plurality of analytical program stored in said program store means, and for controlling the printing operation of said printing means based on the analytical results obtained by said analysing means; and
changing means for changing an analytical program to be used for analysing the printing information by said control means;
wherein when an analytical program to be used is changed by said changing means, said selective means selects predetermined store means for analytical conditions among said plurality of store means for analytical conditions irrespective of the contents of the change.

10. A controller according to claim 9, further comprising, initializing means for initializing the contents stored in said predetermined store means for analytical conditions selected by said selective means to predetermined values in response to change in analytical program by said switching means.

11. A controller according to claim 9, further comprising, a setting value changing means for changing respectively setting values of a plurality of analytical conditions for printing information stored in the store means for analytical conditions selected by said selective means.

12. A controller for printer, comprising:
printing means for forming images on a paper;
setting means for setting independently a plural kind of analytical conditions for printing information;
a plurality of store means for analytical conditions, each for storing a set of setting values which correspond to said plurality of analytical conditions for printing information selected by said setting means;
operation means for inputting data by an operator;
selective means for selecting any one of said store means for analytical conditions corresponding to an operation of said operation means;
program store means for storing a plurality of analytical program for analyzing inputted printing information;
control means for analyzing said printing information according to the analytical conditions of printing information stored in store means for the analytical condition selected by said selective means by using one of said plurality of analytical program stored in said program store means, and for controlling the printing operation of said printing means based on the analytical results obtained by said analysing means; and
changing means for changing an analytical program to be used for analysing the printing information by said control means;
wherein when an analytical program to be used changed by said changing means, said selective means selects predetermined store means for analytical conditions among said plurality of store means for analytical conditions irrespective of the contents of the change.

13. A controller for printer, comprising:
printing means for forming images on a paper;
input means for inputting analytical conditions for printing information;
store means for storing a plurality of sets of analytical conditions for printing information inputted by said inputting means, each set including a plurality of analytical conditions for printing information;
selective means for selecting a set among said plurality of sets of analytical conditions for printing information stored in said store means;
program store means for storing a plurality of analytical programs for analyzing inputted print information;
control means for analyzing said printing information in accordance with the analytical conditions for printing information selected by said selective means by using the one among said plurality of analytical programs as stored in said program store means, and for controlling printing operation of said printer based on this analytical result; and
changing means for changing the analytical program to be used for analyzing printing information by said control means;
wherein said selective means selects a set of analytical conditions for printing information when an analytical program to be used is changed by said changing means, while holding the set of analytical conditions for printing information being selected at the time of the change in said store means.

14. A controller according to claim 13, wherein said changing means selects a predetermined set of analytical conditions for printing information when said analytical program is changed by said selective means irrespective of the analytical program after the change.

15. A controller according to claim 13, wherein said store means for analytical conditions stores a set among said plurality of sets of analytical conditions for printing information in correspondence with the one of said plurality of analytical programs; and said selective means selects a set of analytical conditions for print information which corresponds to a analytical program after the analytical program is selected by said changing means.

16. A controller according to claim 15, wherein
said selective means selects a set of predetermined analytical conditions for print information irrespective of the analytical program when said analytical program is changed by said change means and if a set of analytical conditions for printing information which corresponds to the analytical program after the change is not available.

17. A printer provided with a plurality of emulation modes, comprising:
printing means for forming images on a paper;
setting means for setting a plural kind of analytical conditions for printing information independently;
a plurality of store means each for storing a set of setting values which corresponds to said plural kind of analytical conditions for printing information selected by said setting means;
selective means for selecting one among said plurality of store means for analytical conditions;
program store means for storing a plurality of analytical programs to analyze inputted print information, each analytical program corresponding to one among said plurality of emulation modes;
control means for analyzing said printing information according to the analytical conditions of printing information stored in store means for the analytical condition selected by said selective means by using one of said plurality of analytical program stored in said program store means, and for controlling the printing operation of said printing means based on the analytical results obtained by said analysing means; and
receiving means for receiving a selection signal of emulation mode transmitted from an external device;
operation means being able to be operated by an operator, for selecting an emulation mode to be used among said plurality of emulation modes;
first changing means for changing the analytical program to be used for analyzing printing information by said control means, in accordance with said selection signal of emulation mode received by said receiving means; and
second changing means for changing an analytical program to be used for analyzing printing information by said control means in accordance with the emulation mode selected by said operation means;
wherein said selective means changes the selection of said store means for analytical condition in response to change of analytical program by said first changing means.

18. A printer according to claim 17, further comprising:
third changing means for changing the contents stored in said store means for analytical conditions selected by said selective means, responding to change of analytical program by said second changing means.

19. A printer according to claim 18, wherein said store means for analytical conditions each corresponds to one of said plurality of analytical programs, and said selective means selects store means for analytical conditions which corresponds to the analytical program, in response to the analytical program which is selected by said first changing means.

20. A printer according to claim 19, wherein said selective means selects predetermined store means for analytical conditions irrespective of emulation program when the analytical program is changed and when store means for analytical condition which corresponds to analytical program after the selection is not available; and said third changing means for analytical conditions changes the contents of said predetermined store means for analytical conditions selected by said selective means when said analytical program is changed by said switching means and when the store means for analytical conditions which corresponds to the analytical program after the change of analytical program is not available.

21. A printer according to claim 20, wherein said selective means selects predetermined store means irrespective of selected analytical program in response to the change of analytical program by said first changing means;

said printer further comprising, initializing means for initializing the contents of store means for analytical conditions having been selected by said selective means to predetermined values in response to the change of analytical program by said first changing means, and for initializing to predetermined values the contents of store means for analytical conditions selected by said selective means in response to the change of analytical program by said second changing means.

* * * * *